(12) United States Patent
Tsukuda et al.

(10) Patent No.: US 8,798,162 B2
(45) Date of Patent: Aug. 5, 2014

(54) ENCODING METHOD, DECODING METHOD, ENCODER, AND DECODER

(75) Inventors: Noriaki Tsukuda, Fukuoka (JP); Yuuji Nomura, Fukuoka (JP); Yasuo Misuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 348 days.

(21) Appl. No.: 13/232,762

(22) Filed: Sep. 14, 2011

(65) Prior Publication Data

US 2012/0069909 A1 Mar. 22, 2012

(30) Foreign Application Priority Data

Sep. 22, 2010 (JP) ................... 2010-212822

(51) Int. Cl.
*H04N 7/26* (2006.01)
(52) U.S. Cl.
CPC ................. *H04N 7/26244* (2013.01)
USPC .................................... 375/240.24
(58) Field of Classification Search
None
See application file for complete search history.

(56) References Cited

U.S. PATENT DOCUMENTS 6,408,027 B2 6/2002 Mori et al.
2001/0046263 A1* 11/2001 Yamada et al. .......... 375/240.12

FOREIGN PATENT DOCUMENTS

JP 9-139912 A 5/1997
JP 2001-169281 A 6/2001

* cited by examiner

*Primary Examiner* — Sath V Perungavoor
*Assistant Examiner* — Kate Luo
(74) *Attorney, Agent, or Firm* — Fujitsu Patent Center

(57) ABSTRACT

An encoding method includes encoding moving image; determining whether an information amount of the encoded moving image data in units of a picture satisfies a threshold to control a virtual buffer obtained by virtually modeling a reception buffer of a decoding device that is a transmission destination of the encoded moving image data; and setting, by dividing a picture included in the encoded moving image data, a decoding time for each divided picture to cause the decoding device to decode each divided picture when the determining determines the information amount of the encoded moving image does not satisfy the threshold to control the virtual buffer.

6 Claims, 18 Drawing Sheets

ENCODING METHOD, DECODING METHOD, ENCODER, AND DECODER

CROSS-REFERENCE TO RELATED APPLICATION

This application is based upon and claims the benefit of priority of prior Japanese Patent Application No. 2010-212822, filed on Sep. 22, 2010, the entire contents of which are incorporated herein by reference.

FIELD

The embodiments discussed herein relate to an encoding method, a decoding method, an encoder, and a decoder.

BACKGROUND

When encoded data of a moving image is transmitted from an encoder to a decoder, an underflow and an overflow of a reception buffer that accumulates encoded data at a reception side needs to be prevented. To this end, the encoder uses a virtual buffer that is obtained by virtually modeling a reception buffer of the decoder to control an information amount to be generated by encoding a moving image so that the moving image is reproduced by the decoder with a substantially constant bit rate. The above-described virtual buffer is also referred to as a video buffering verifier (VBV) buffer.

For example, when a scene with an intense movement is switched to another scene, an information amount of encoded data generated at an interval until the scene switches shifts at a high level and an information amount of encoded data generated when the scene switches increases further. As a result, the reception buffer of the decoder may be depleted, in other words, a buffer underflow may be caused.

FIG. 16 illustrates an occurrence of a buffer underflow. Description will be made in the example of FIG. 16 by assuming a VBV buffer that is included in an ideal decoder and encoded data of a picture for which decoding is completed is removed from the VBV buffer immediately. The horizontal axis of the graph in FIG. 16 indicates time. Decoding Time Stamp (DTS) on the horizontal axis of the graph in FIG. 16 indicates a decoding time when encoded data is decoded by the VBV buffer, in other words, removal time when the encoded data is removed from the VBV buffer, and substantially the same time is assigned to encoded data for one picture. The vertical axis of the graph in FIG. 16 is an information amount of encoded data that occupies the VBV buffer, in other words, the buffer occupancy. The gradient of the graph in FIG. 16 indicates a bit rate of encoded data that is input to the VBV buffer.

As illustrated in FIG. 16, in intervals of DTS0, DTS1, and DTS2, pictures accumulated in the VBV buffer are removed after decoding. In the intervals of DTS0, DTS1, and DTS2, moving images with intense movement between frames are encoded. Accordingly, the buffer occupancy transitions with a tendency to be depleted. When the processing reaches the DTS3, a scene change of a video is caused and thereby an amount of encoded data that may not be input with an input bit rate to the VBV buffer is generated. As a result, buffering of encoded data of a picture to be decoded at DTS3 is not completed; thereby a buffer underflow occurs.

Japanese Laid-open Patent Publication No. 2001-169281 discusses a technology that skips encoding a macro block when an underflow of a VBV buffer is detected as a technology to prevent a buffer underflow. Skipping encoding a macro block as described above reduces an information amount of encoded data. The macro block here indicates data that is obtained by dividing moving image data before encoding into a certain size, for example, 16 pixels×16 pixels, or 8 pixels×8 pixels. The "skip" assumes a macro block to be encoded as a macro block of a picture that is already encoded.

When a scene of an image is switched from a state without movement, an information amount of encoded data generated in an interval until the scene change transitions with a low level. In contrast, an information amount of encoded data generated at the scene change is sharply increased. As a result, a state of an overflow of the reception buffer of the decoder, in other words, a buffer overflow may occur.

FIG. 17 illustrates occurrence of a buffer overflow. Description will be made in the example of FIG. 17, as in FIG. 16, by assuming a VBV buffer that is included in an ideal decoder and encoded data of a picture for which decoding is completed is removed from the VBV buffer immediately. Descriptions of the graph in FIG. 17 are substantially the same as those described by referring to FIG. 16.

As illustrated in FIG. 17, in intervals of DTS0, DTS1, and DTS2, pictures accumulated in the VBV buffer are removed after decoding respectively. In the intervals of DTS0, DTS1, and DTS2, moving images with no movement between frames are encoded. Thus, the buffer occupancy transitions with a tendency of an overflow. When the processing reaches the DTS3, a scene change of an image is caused and thereby an amount of encoded data that may not be accommodated in the VBV buffer is generated. Accordingly, all encoded data of a picture that needs to be decoded at DTS3 is not completely buffered and thereby the buffer overflow occurs.

Japanese Laid-open Patent Publication No. H09-139912 discusses a technology that inserts a stuffing bit that is treated as invalid data at decoding into encoded data when an overflow of a VBV buffer is detected as a technology to prevent the above-described buffer overflow. The stuffing reduces the buffer occupancy rate in the decoder.

SUMMARY

In accordance with an aspect of the embodiments, an encoding method includes encoding moving image data; determining whether an information amount of the encoded moving image data in units of a picture satisfies a threshold to control a virtual buffer obtained by virtually modeling a reception buffer of a decoding device that is a transmission destination of the encoded moving image data; and setting, by dividing a picture included in the encoded moving image data, a decoding time for each divided picture to cause the decoding device to decode each divided picture when the determining determines the information amount of the encoded moving image data does not satisfy the threshold to control the virtual buffer.

The object and advantages of the invention will be realized and attained by at least the features, elements, and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which.

DESCRIPTION OF EMBODIMENTS

As described previously above, in a related art example, when encoded data of a moving image is transmitted from an encoder to a decoder, an underflow and an overflow of a reception buffer that accumulates encoded data at a reception side should be prevented. However, doing so introduces a problem in that the related art example adjusts an information amount of encoded data in units of a picture and has a disadvantage in that the resultant quality of a moving image is non-uniform.

In other words, the above-described related art reduces an information amount of encoded data by skipping encoding a macro block when an underflow of the VBV buffer occurs. Moreover, the above-described related art adds a stuffing bit that does not contribute to the quality of a moving image when an overflow of the VBV buffer occurs. Increasing and decreasing the information amount of encoded data is controlled by prioritizing occupancy of the VBV buffer. Therefore, the quality of a moving image may be decreased when the information amount of the encoded data is controlled to increase and decrease by prioritizing occupancy of the VBV buffer. Thus, quality of the moving image may become unstable by avoiding an underflow or an overflow of the buffer.

Hereinafter, an encoding method, a decoding method, an encoder, and a decoder will be described by referring to the accompanying drawings. The embodiments described hereunder do not limit the disclosed technologies. Each of the embodiments may be combined as appropriate as long as such combination does not cause inconsistency among contents of the processing.

Figure 1:
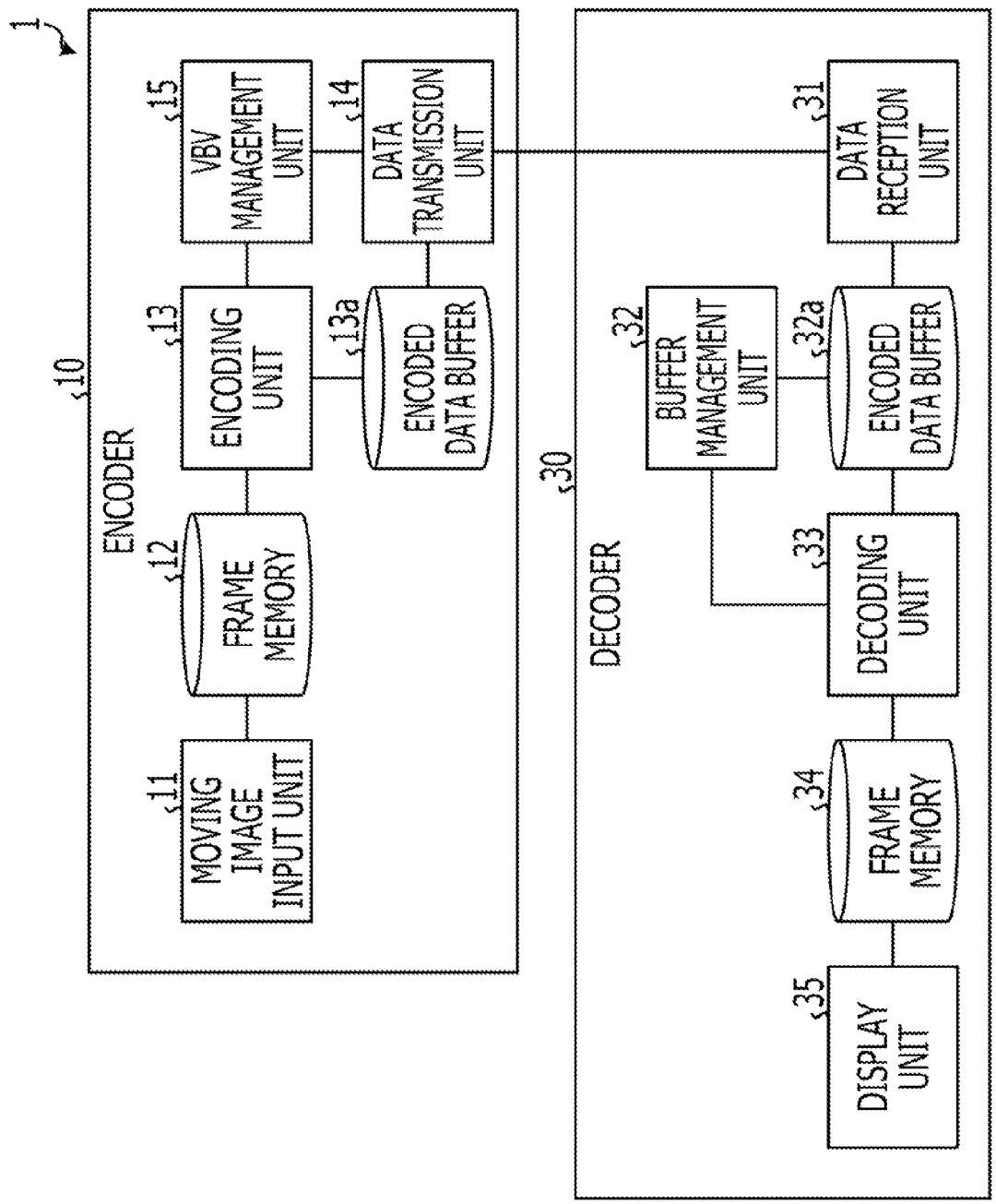
FIG. 1 illustrates a configuration of a transmission system according to a first embodiment.

FIG. 1 illustrates a configuration of a transmission system according to a first embodiment. A transmission system 1 in FIG. 1 includes an encoder 10 and a decoder 30. Encoded data of a moving image is transmitted between the encoder 10 and the decoder 30. In the example of FIG. 1, description hereunder will be made by assuming encoded data is transmitted between the encoder 10 and the decoder 30 in real time. However, the explanation may be applied to a case in which encoded data is transmitted after being delayed, for example.

The encoder 10 encodes an input moving image. The encoder 10 controls an information amount that is generated by encoding a moving image by using a virtual buffer that is obtained by virtually modeling a buffer in which encoded data is accumulated in the decoder 30 so that the decoder 30 may reproduce the moving image with a substantially constant bit rate. Here, a case is assumed that the virtual buffer, in other words, a video buffering verifier (VBV) buffer is operated in accordance with standards of a Moving Picture Experts Group (MPEG), such as H. 264. However, other compression encoding methods may be applied as well. An encoding function of the encoder 10 may be achieved by software, or by an integrated circuit such as a Large Scale Integration (LSI).

The decoder 30 decodes encoded data of an input moving image. The decoder 30 accumulates encoded data of a moving image received from the encoder 10 in an encoded data buffer 32a, which will be described later, and removes the encoded data from the encoded data buffer 32a according to a time stamp attached to the encoded data and decodes the encoded data. A decoding function of the decoder 30 may be achieved by software, or by an integrated circuit such as a Large Scale Integration (LSI).

A method to substantially avoid a failure of the VBV buffer by the encoder according to the embodiment will be described. The encoder 10 according to the embodiment utilizes a method in which an order to decode pictures encoded by the encoder 10 is different from an order to display the pictures after decoding. In other words, the decoder 10 divides encoded data, the decoding time of which is earlier than the display time, and assigns a different decoding time to each of the divided encoded data. Accordingly, a failure of the VBV buffer, in other words, an underflow and an overflow may be substantially avoided.

Figure 2:
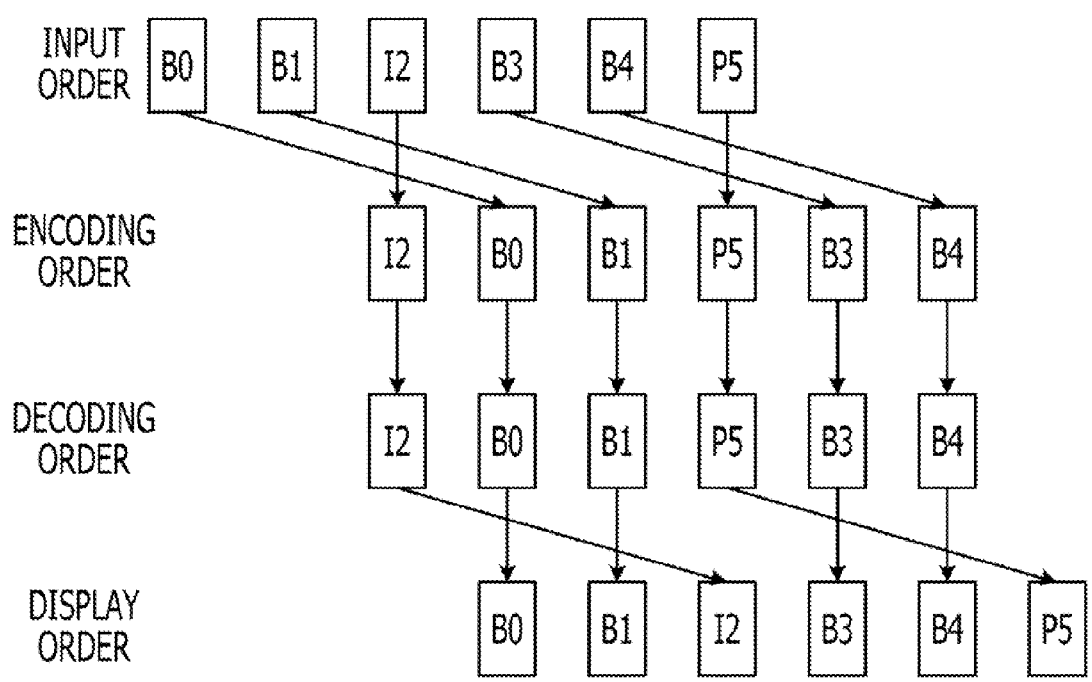
FIG. 2 illustrates a relationship of a decoding order and a display order.

A relationship of a decoding order and a display order will be described by referring to FIG. 2. FIG. 2 illustrates the following orders, an input order that a moving image is input, an encoding order that the moving image is encoded by the encoder 10, a decoding order that the encoded data is decoded by the decoder 30, and a display order that the decoded data is displayed in the order from left to right. The rectangular objects in FIG. 2 indicate one frame of a moving image. A code I in a rectangular object in FIG. 2 indicates an Intra-Picture (I picture) among a Group of pictures (GOP). A code P in a rectangle object in FIG. 2 indicates a Predictive-Picture (P picture). A code B in a rectangle object in FIG. 2 indicates a Bidirectionally Picture (B picture). Numbers assigned to right sides of codes I, P, or B indicate an order that the moving image is input, in other words, the display order.

As illustrated in FIG. 2, a moving image is input to the encoder 10 in order of a frame B0, a frame B1, a frame I2, a frame B3, a frame B4, and a frame P5. The encoder 10 rearranges frames so that frames to be encoded to an I picture or a P picture come before frames to be encoded to B pictures so as to encode the frames of an I picture or a P picture that are referred to when encoding the B picture are encoded earlier. In the example of FIG. 2, the encoder 10 rearranges the frames in order of the frames I2, B0, B1, P5, B3, and B4.

The encoder 10 encodes each frame in order of the rearranged frames, I2, B0, B1, P5, B3, and B4. Accordingly, I2 is an I picture, P5 is a P picture, and B0, B1, B3, and B4 are B pictures that are generated. Encoded data of the pictures, I2, B0, B1, P5, B3, and B4 are transmitted from the encoder 10 to the decoder 30 as stream data.

Meanwhile, the decoder 30 decodes the encoded data received from the encoder 10 in order of the pictures, I2, B0, B1, P5, B3, and B4. Accordingly, frames I2, B0, B1, P5, B3, and B4 are generated. The decoder 30 rearranges the frames in a display order of the frames B0, B1, I2, B3, B4, and P5, and causes a display unit display the frames.

Figure 3:
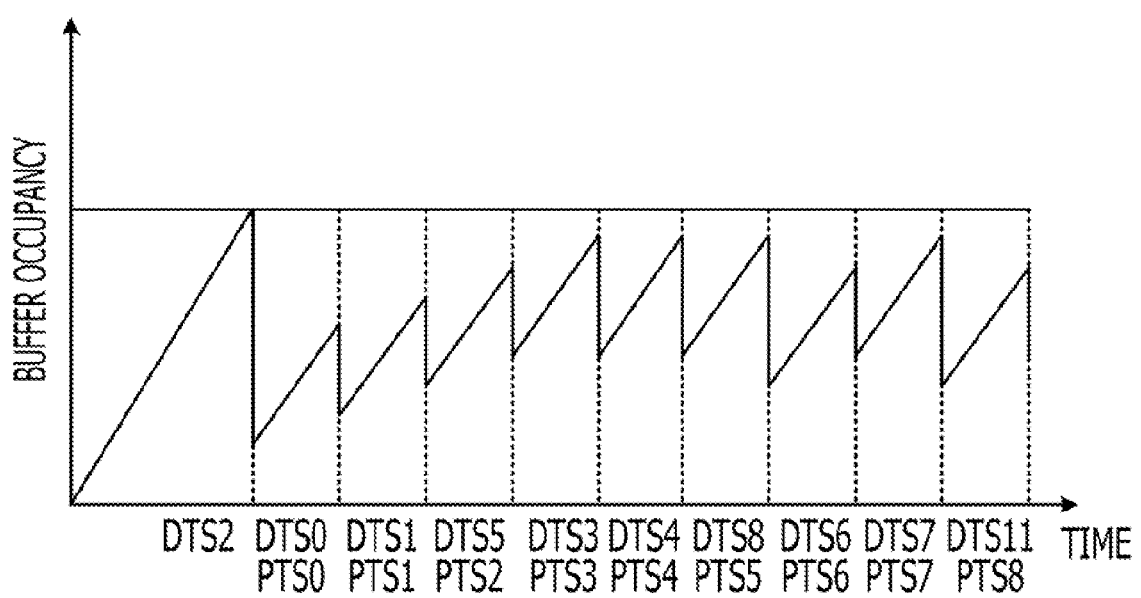
FIG. 3 illustrates a relationship between a decoding time and a display time of units of a picture and an occupancy rate of a VBV buffer.

FIG. 3 illustrates a relationship between a decoding time and a display time in units of a picture and occupancy of the VBV buffer. In the example of FIG. 3, description is made by assuming a VBV buffer that is included in an ideal decoder and encoded data of a picture for which the decryption is completed is removed from the VBV buffer immediately. The horizontal axis of the graph in FIG. 3 indicates time and time elapses along the horizontal axis toward the right. The Decoding Time Stamp (DTS) on the horizontal axis in FIG. 3 indicates a decoding time when encoded data is decoded by the VBV buffer, in other words, a removal time when the encoded data is removed from the VBV buffer. The Presentation Time Stamp (PTS) on the horizontal axis in FIG. 3 indicates a display time when a frame is displayed after decoding. The vertical axis of the graph in FIG. 3 indicates an information amount of encoded data that occupies the VBV buffer, in other words, a size of occupancy of the buffer. The gradient of the graph in FIG. 3 indicates a bit rate of an encoded data that is input to the VBV buffer.

As illustrated in FIG. 3, the picture I2 is decoded at DTS[2] and displayed at PTS[2](=DTS[5]). The picture B0 is decoded at DTS[0] and displayed at PTS[0]. The picture B1 is decoded at DTS[1] and displayed at PTS[1]. The picture P5 is decoded at DTS[5] and displayed at PTS[5](=DTS[8]). The picture B3 is decoded at DTS[3] and displayed at PTS[3]. The picture B4 is decoded at DTS[4] and displayed at PTS[4]. Subsequent pictures, which are not illustrated, are decoded and displayed in the same manner as described above.

As described above, the DTS and PTS of the I picture and the P picture that are referred to when decoding a B picture are not the same. In other words, the PTS of the I picture and the P picture are delayed until a B picture that uses frames of the I picture or the P picture for decoding is displayed. For example, the picture P5 is decoded at DTS[5], however the picture P5 is actually displayed at PTS[5](=DTS[8]) that is after the picture B3 and picture B4 the input orders of which precede P5 are decoded and displayed. Thus, in order to properly display the picture P5 by the decoder 30, all of data in the picture is not necessarily decoded at DTS[5]. In other words, decoding the picture P5 may be completed before the picture P5 is used by the picture B3 and picture B4 as a reference picture at decoding.

The encoder 10 divides the I picture or the P picture that are not completely transmitted to the decoder 30 with a transmission bit rate, or that may not be accommodated in the VBV buffer by utilizing the above described time difference between DTS and PTS. The encoder 10 advances or delays the initial decoding time of a part of or the entire data of a divided I picture or P picture before the B picture, which uses decoded data of the I picture or P picture for decoding, is decoded. Accordingly, an underflow and an overflow of the buffer may be substantially avoided. According to the embodiment, a case in which the I picture and P picture are divided and decoding times are set is described. However, the B picture may be divided instead and the decoding time may be set when the encoder 10 delays transmission of encoded data to the decoder 30.

Figure 4:
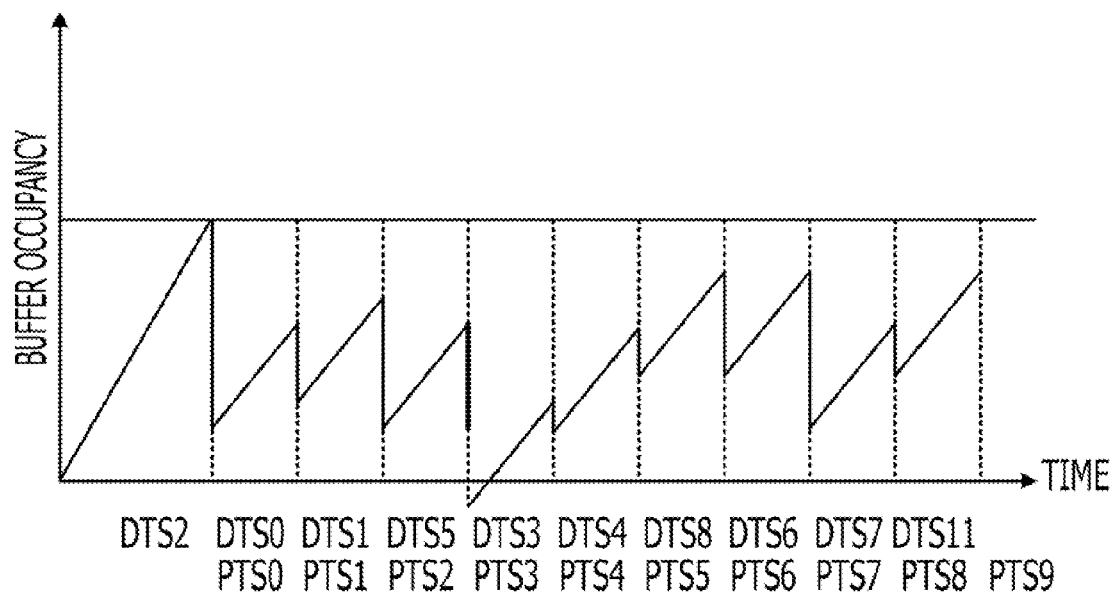
FIG. 4 illustrates an aspect of an occurrence of a buffer underflow.
Figure 5:
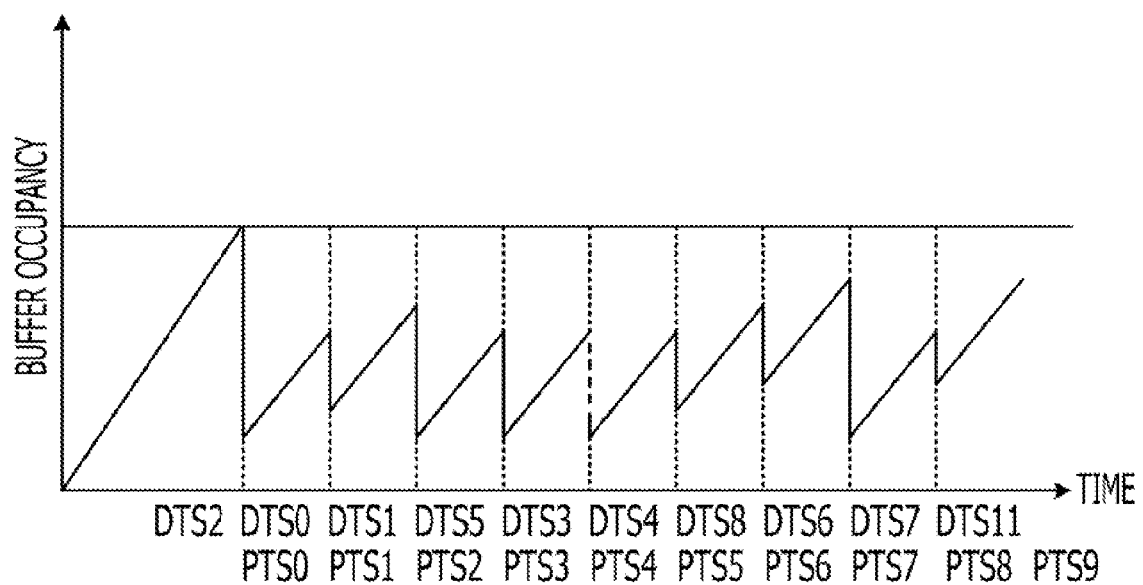
FIG. 5 illustrates an example of avoiding a buffer underflow.

Avoiding a buffer underflow will be described by referring to FIGS. 4 and 5. FIG. 4 illustrates an aspect of an occurrence of a buffer underflow. FIG. 5 illustrates an example of avoiding a buffer underflow. The examples of both FIG. 4 and FIG. 5 assume that encoding, decoding, and displaying are executed in units of a picture illustrated in FIG. 2.

As illustrated in FIG. 4, an information amount of the picture P5 encoded by the encoder 10 is greater than a bit rate specified between the encoder 10 and the decoder 30 illustrated in FIG. 1. Hence, the encoder 10 may not transmit all of the picture P5 by DTS[5](=PTS[2]). Therefore, an underflow of the VBV buffer is caused at DTS[5](=PTS[2]).

In order to avoid the occurrence of the underflow, the encoder 10 executes the following processing as one example. In other words, the encoder 10 divides the encoded data of the picture P5 that is a bottleneck of the underflow into two parts that are a former part and a latter part. The former part here indicates bold lines in FIG. 4, while the latter part indicates bold dotted lines in FIG. 5. The encoder 10 sets a decoding time of data in the latter part to be decoded at DTS[3], that is when the picture B3 is decoded subsequent to the picture P5 without decoding the data in the latter part at DTS[5]. In other words, the encoder 10 sets decoding time of the data in the former part obtained by dividing the picture P5 at DTS[5] while setting decoding time of the data in the latter part at DTS[3].

As described above, the encoder 10 according to the embodiment causes the decoder 30 to decode one picture by dividing the picture into a former part and a latter part, and decodes the former part at DTS[5] while decoding the latter part at DTS[3] without decoding the encoded data of the one picture all at once. The encoder 10 according to the embodiment sets a decoding time of each of the divided data, e.g., the former part and the latter part of the one picture, so that decoding the picture P5 is started before starting decoding the picture B3 and picture B4. Hence, the picture B3 and the picture B4 that are decoded by referring to the picture P5 may be decoded even when decoding the data in the latter part is delayed. As a result, an underflow of the buffer may be substantially avoided without reducing a total information amount of the picture P5. Therefore, transmitting the picture P5 by DTS[5] by reducing an information amount is not needed to make the decoder 30 decode the picture P5 at DTS[5]. Accordingly, the encoder 10 according to the embodiment may substantially achieve uniform image quality among frames of a moving image.

Figure 6:
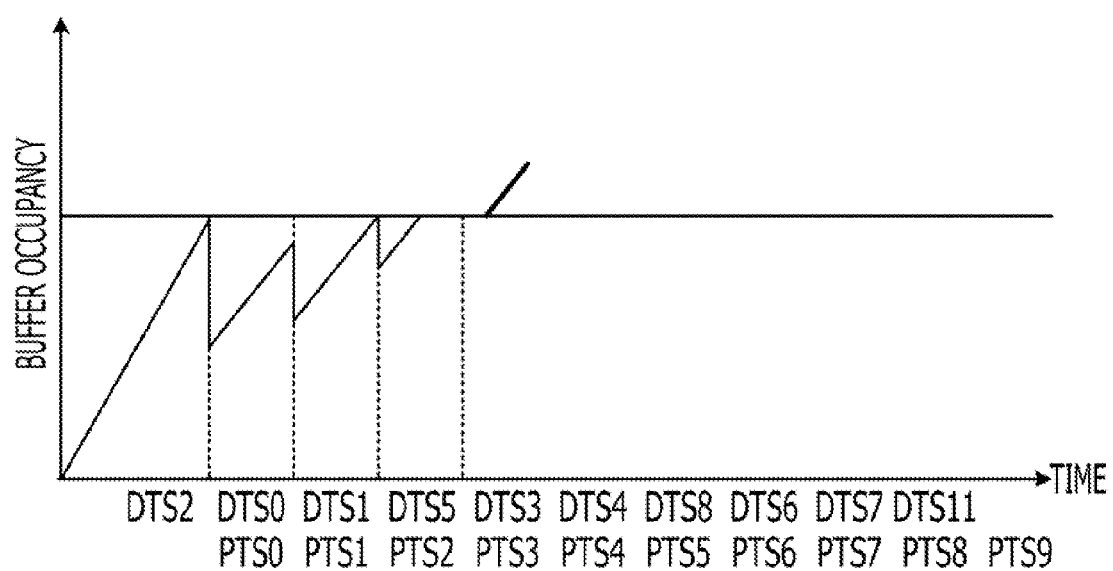
FIG. 6 illustrates an aspect of an occurrence of a buffer overflow.
Figure 7:
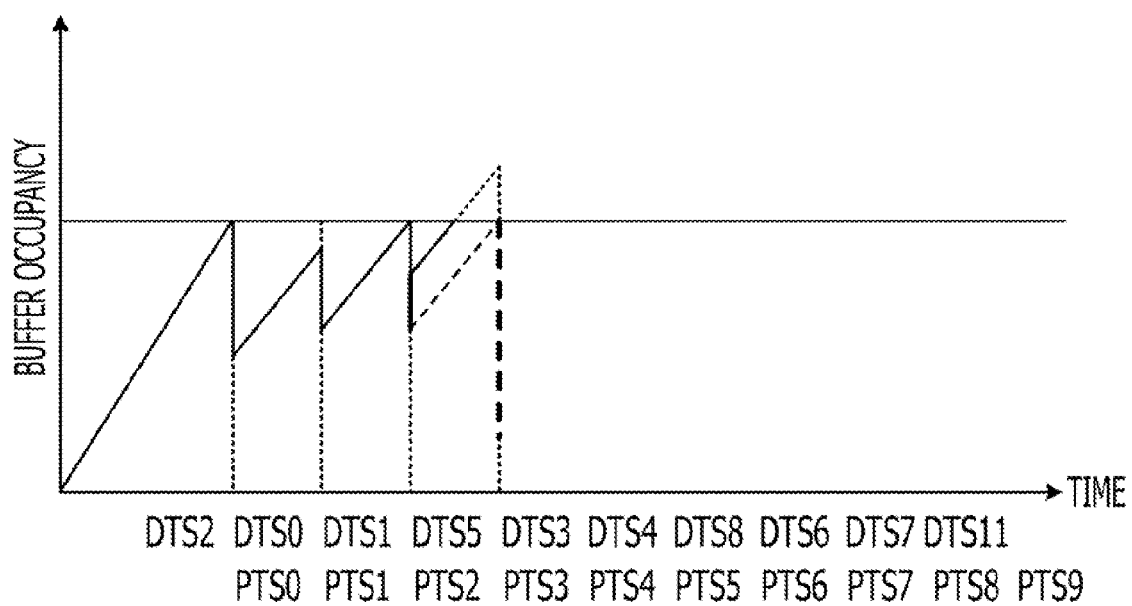
FIG. 7 illustrates an example of avoiding a buffer overflow.

A method to avoid a buffer overflow will be described by referring to FIGS. 6 and 7. FIG. 6 illustrates an aspect of an occurrence of a buffer overflow. FIG. 7 illustrates an example of avoiding a buffer overflow. Examples of FIG. 6 and FIG. 7 both assume that encoding, decoding, and displaying are performed in units of a picture as illustrated in FIG. 2.

As illustrated in FIG. 6, an information amount of the picture P5 encoded by the encoder 10 exceeds a capacity of the VBV buffer. Hence, an overflow of the VBV buffer is caused at DTS[5](=PTS[2]).

In order to avoid an occurrence of an overflow, the encoder 10 performs the following processing as one example. In other words, the encoder 10 divides the encoded data of the picture P5 that is a bottleneck of the overflow into two parts, the former part and the latter part. The former part here indicates bold lines in FIG. 6, while the latter part indicates bold dotted lines in FIG. 6 and FIG. 7. The encoder 10 sets a decoding time of data in the former part among the divided data of the picture P5 to decode at DTS[1] that is when the picture B1 is decoded before the picture P5 without decoding the data in the former data DTS[5]. In other words, the encoder 10 sets a decoding time of the data in the former part obtained by dividing the picture P5 at DTS[1] while decoding time of the data in the latter part at DTS[5].

As described above, the encoder 10 according to the embodiment causes the decoder 30 to decode one picture by dividing the one picture into the former part at DTS[1] and the latter part at DTS[5] without decoding the encoded data all at once. At this time, the encoder 10 according to the embodiment sets a decoding time of each of the divided data so that decoding the picture P5 is started before starting decoding the picture B3 and picture B4. Hence, the picture B3 and the picture B4 that are decoded by referring to the picture P5 may be decoded because decoding the data in the former part is advanced. Accordingly, the encoder 10 according to the embodiment may improve image quality because encoded data generated by encoding the picture P5 may be transmitted in advance without adding data such as a stuffing bit that does not contribute to image quality of a moving image. Therefore, the encoder 10 according to the embodiment may achieve uniform image quality among frames of a moving image.

As described above, the encoder 10 according to the embodiment divides a picture into a smaller unit than one picture and causes the decoder 30 to advance or postpone decoding respective parts of the divided data. Thus the encoder 10 according to the embodiment does not need to increase or decrease an information amount of encoded data even if an underflow or an overflow occur when the encoder 10 causes the decoder 30 decode in units of a picture. Although the encoder 10 may divide a picture into a smaller unit than one picture, doing so does not decrease the amount of encoded data decoded by the decoder 30. Therefore, the encoder 10 according to the embodiment may achieve uniform image quality among frames of a moving image. For example, a method to avoid the buffer underflow may be applied when a scene changes from a state with intense movement. As another example, the method to avoid a buffer overflow may be applied when a scene changes from a state with no movement.

A configuration of the encoder according to the embodiment will be described. The encoder 10 illustrated in FIG. 1 includes a moving image input unit 11, a frame memory 12, an encoded data buffer 13a, an encoding unit 13, a data transmission unit 14, and a VBV management unit 15.

The moving image input unit 11 is a processing unit to input a moving image into encoder 10. For example, the moving image input unit 11 may input a moving image by receiving a pick-up image from a pick-up device. As another example, the moving image input unit 11 may input a moving image by downloading the moving image from an external device that is connected through a network. As yet another example, the moving image input unit 11 may input a moving image by reading from the moving image from a portable storage medium such as a Compact Disc Read Only Memory (CD-ROM) or a Digital Versatile Disc (DVD). The moving image input unit 11 may input a moving image by reading the moving image from a storage unit, which is not illustrated. As described above, the moving image input unit 11 may be performed by selecting from e.g., a pick-up device, a reader, or a communication interface.

The frame memory 12 stores frame data of a moving image. For example, the frame memory 12 stores frames of a moving image that is input by the moving image input unit 11. Here, the example in which frame data stored in the frame memory 12 is input by the moving image input unit 11 is described. However, frame data may be stored beforehand without using the moving image input unit 11.

The encoded data buffer 13a accumulates encoded data. For example, data encoded by the encoding unit 13, which will be described later, is stored in the encoded data buffer 13a. The encoded data accumulated in the encoded data buffer 13a is transmitted to the decoder 30 by the data transmission unit 14, which will be described later, and the transmitted encoded data is then deleted. Note that encoded data in the encoded data buffer 13a may be automatically deleted by a timer after accumulated for a certain period.

The encoding unit 13 encodes frames stored in the frame memory 12. The encoding unit 13 rearranges the order of frames so that frames to be encoded to an I picture or a P picture comes earlier than frames to be encoded to a B picture and then removes the frames. The encoding unit 13 stores encoded data obtained by sequentially encoding the rearranged frames into the encoded data buffer 13a. The encoding unit 13 outputs an information amount generated by encoding a macro block (hereinafter referred to as "generated information amount") into the VBV management unit 15, which will be described later. The "macro block" is data obtained by dividing data of a moving image before encoding into 16×16 pixels, or 8×8 pixels.

The data transmission unit 14 transmits encoded data accumulated in the encoded data buffer 13a to the decoder 30. The data transmission unit 14 inserts attach data input by the VBV management unit 15, which will be described later, into where the picture is divided among the encoded data taken out from the encoded data buffer 13a, and transmits the data to the decoder 30. The attach data is information attached by the VBV management unit 15 to make the decoder 30 recognize that the picture is divided.

The VBV management unit 15 manages the VBV buffer based on an information amount generated through encoding by the encoding unit 13. For example, the VBV management unit 15 determines whether an underflow is caused when the decoder 30 decodes encoded data in units of a picture whenever the encoding unit 13 takes out frame data from the frame memory 12. At this time, when an underflow is caused, the VBV management unit 15 divides encoded data of a picture currently being input and inserts attach data after the data in the former part in order to make the decoder 30 recognize the DTS of the data in the latter part. As described above, encoded data of a picture is divided when an underflow is caused, thus an overflow is not caused other than in a rare case in which the data in the latter part after the division has an information amount close to a capacity of the VBV buffer. Accordingly, the VBV management unit 15 does not perform division to avoid an overflow. When encoding a picture is completed without causing an underflow, the VBV management unit 15 determines whether an overflow is caused after time for the DTS of one picture is elapsed. At this time, when an overflow is caused, the VBV management unit 15 starts encoding a picture to which a subsequent DTS is supposed to be assigned initially and divides the encoded data of the picture when the overflow is not detected. The VBV management unit 15 inserts attach data after the data in the former part to make the decoder 30 recognize DTS of data in the latter part.

Parameters used by the VBV management unit 15 will be described below. Examples of the parameters include, "MAX_MB_NUM", "mbnum", "B(mbnum)", "MAX_DIV_NUM", "div_num", "MB_div[divnum]", "Bitrate", "VBVBOC_ini", "SumB", and "SumB_TH[divnum]." Moreover, examples of the parameters include "VBVBOC_divnum", "DTS_ini", "DTS[divnum]", and "DTS_1pic."

Among the parameters, the "MAX_MB_NUM" indicates the number of total Macro Blocks (MB) in a picture. The "mbnum" indicates a macro block number, and is incremented from 0 to a number, MAX_NUM−1, for example.

The "B(mbnum)" indicates a generated information amount of a macro block at each MB number. The "MAX_DIV_NUM" indicates substantially the maximum number of divisions. The "div_num" indicates a division number, and for example, is incremented from 0 to MAX_DIV_NUM−1. The "MB_div[divnum]" indicates an end MB number that is included in an area of the division number. The "Bitrate" indicates a bit rate between the encoder 10 and the decoder 30. The "VBVBOC_ini" indicates occupancy of the VBV buffer of a head of a picture when the decoder 30 decodes encoded data in units of a picture. The "SumB" indicates an accumulated sum value of a generated information amount. The "SumB_TH[divnum]" indicates a threshold of a generated information amount for each division number and the threshold is a condition for data division. The "VBVBOC_divnum" indicates occupancy of the VBV buffer for the latest division number (hereinafter referred to as "division VBV buffer occupancy"). The "DTS_ini" indicates initial decoding time assigned when the decoder 30 decodes encoded data in units of a picture. The "DTS[divnum]" is a decoding time assigned to encoded data with a latest division number (hereinafter referred to as "division decoding time"). The "DTS_1pic" indicates a DTS addition value for one picture.

For example, the VBV management unit 15 initializes each parameter when encoding a macro block of a head of a picture is started. As one example, the VBV management unit 15 initializes the division number, "div_num" to 0. Moreover, the VBV management unit 15 initializes the end MB number, "MB_div[0]~MB_div[MAX_DIV_NUM−1]" to 0. The VBV management unit 15 initializes the division decoding time, "DTS[0]~DTS[MAX_DIV_NUM−1]" to "DTS_ini." Furthermore, the VBV management unit 15 initializes the division VBV buffer occupancy, "VBVBOC_divnum [MAX_DIV_NUM−1]" to "VBVBOC_ini."

The VBV management unit 15 determines a substantially maximum generated information amount threshold, "SumB_TH[0]" at initial decoding time assigned when the decoder 30 decodes encoded data in units of a picture, in other words, at the division decoding time, DTS[0]. A method to determine the substantially maximum generated information amount threshold is described below. For example, as illustrated in FIG. 8, the VBV management unit 15 determines the substantially maximum generated information amount threshold "SumB_TH[0]" by subtracting a buffer depletion preventive threshold, "VBV_TH" that is defined beforehand to reduce if not prevent an underflow from the division VBV buffer occupancy, "VBVBOC_divnum[0]." FIG. 8 illustrates processing by the VBV management unit.

The VBV management unit 15 causes the encoding unit 13 to decode a macro block corresponding to a current MB number, "mbnum." The VBV management unit 15 obtains a generated information amount of the macro block, "B(mbnum)." The VBV management unit 15 executes a calculation of SumB=ΣB(i)(MB_div[divnum−1~mbnum]) to cumulatively add the obtained generated information amount, "B(mbnum)" to accumulated sum value of the current division number, "div_num." The cumulative sum value of the generated information amount is a cumulative sum value in divided data, and resets to 0 when a picture is divided. The cumulative sum value of the generated information amount is substantially equal to the cumulative sum value of the generated information amount of pictures when no picture is divided.

The VBV management unit 15 determines whether a cumulative sum value "SumB" of a generated information amount of the current division number, "div_num" exceeds the substantially maximum generated information amount threshold, "SumB_TH[divnum]." Through the threshold determination, the VBV management unit 15 determines whether a picture needs to be divided. The VBV management unit 15 repeats the above-described processing after incrementing the MB number for one when the cumulative sum value of the generated information amount "SumB" is the substantially maximum generated information amount threshold, "SumB_TH[divnum]" or less. In the example of FIG. 8, the cumulative sum value "SumB" of the generated information amount "B(X−1)" of the MB number "X−1" is less than the substantially maximum generated information amount threshold "SumB_TH[0]." Therefore, when the MB number "X−1" is encoded, dividing the picture is determined to be unnecessary. The "SumB" that is cumulative sum value of the generated information amount B(X) of the MB number "X" is greater than the substantially maximum generated information amount threshold, "SumB_TH[0]." In this case, dividing the picture is desirable.

Figure 8:
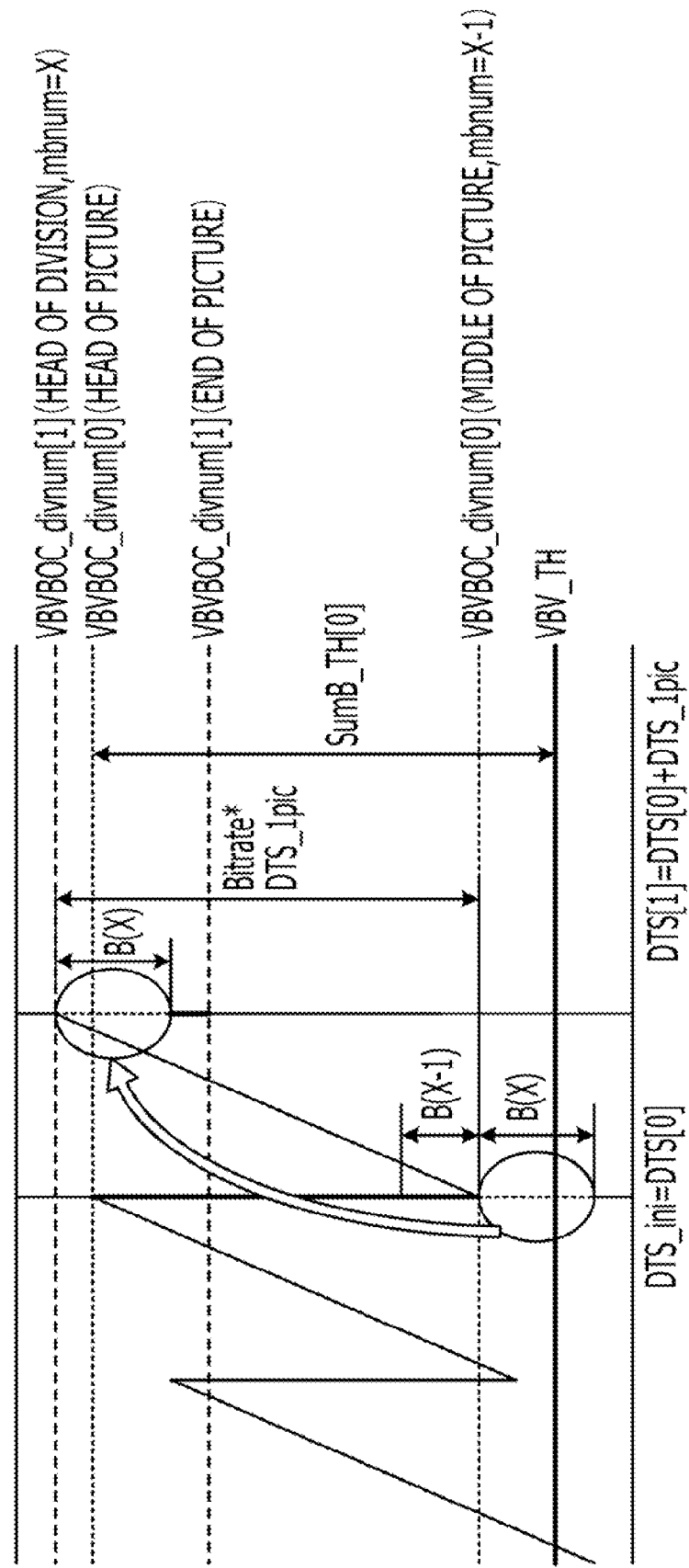
FIG. 8 illustrates processing by a VBV management unit.

When the cumulative sum value of the generated information amount, "SumB" exceeds the substantially maximum generated information amount threshold "SumB_TH[divnum]", the VBV management unit 15 defines a preceding MB number, "mbnum" as an end MB number of the boundary of the division, "MB_div[divnum]." In the example of FIG. 8, the MB number "X−1" is determined to be the end MB number "MB_div[divnum]" because the cumulative sum "SumB" of the generated information amount "B(X)" of the MB number, "X" exceeds the substantially maximum generated information amount "SumB_TH[0]." Accordingly, the VBV management unit 15 assumes encoded data of macro blocks with the MB number up to "X−1" as encoded data to be decoded at DTS[0].

The VBV management unit 15 determines the division VBV buffer occupancy "VBVBOC_divnum" at division decoding time "DTS[divnum]." In the example of FIG. 8, the VBV management unit 15 calculates the VBV buffer occupancy when encoded data is decoded at DTS[0] and is removed from the VBV buffer. In other words, the VBV buffer occupancy, "VBVBOC_divnum[0]" when the MB number, "X−1" is encoded is calculated by subtracting a value "SumB" obtained by cumulatively adding generated information amount "B(X−1)" of the MB number, "X−1" from the head of the picture, "VBVBOC_divnum[0]."

The VBV management unit 15 advances DTS for one picture by adding a DTS addition value for one picture, "DTS_1pic" to the division decoding time "DTS[divnum]." The VBV management unit 15 advances the VBV buffer occupancy for 1 DTS by multiplying the division VBV buffer occupancy, "VBVBOC_divnum" at the division decoding time "DTS[divnum]" by the DTS addition value for one picture "DTS_1pic"×bit rate "Bitrate." The VBV management unit 15 increments the division number, "div_num." In the example of FIG. 8, the VBV management unit 15 determines division decoding time after the divided MB number "X" as "DTS[1]" by adding the DTS addition value for one picture, "DTS_1pic" to the division decoding time "DTS[0]." After that, the VBV management unit 15 multiplies the "VBVBOC_divnum[0]" by DTS addition value for one picture "DTS_1pic"×bitrate "Bitrate." The division VBV buffer occupancy, "VBVBOC_divnum[1]" at the division decoding time "DTS[1]" is calculated as described above. Accordingly, the decoder 30 decodes encoded data after the MB number, "X" at DTS[1] instead of DTS[0] if the decoder 30 decodes encoded data in units of a picture as illustrated by the dotted lines in the circles in FIG. 8. The VBV management unit 15 increments the division number "0" for one to "1."

The VBV management unit 15 determines a substantially maximum generated information amount threshold, "SumB_TH[divnum]" at division decoding time, "DTS[divnum+1]" of the previously incremented division number, "divnum+1." In the example of FIG. 8, a substantially maximum generated information amount threshold, "SumB_TH [divnum]" at division decoding time, "DTS[1]" is determined. For instance, the VBV management unit 15 employs a certain ratio of the VBV buffer, for example, 70% as a substantially maximum generated information amount threshold after the division.

Figure 9:
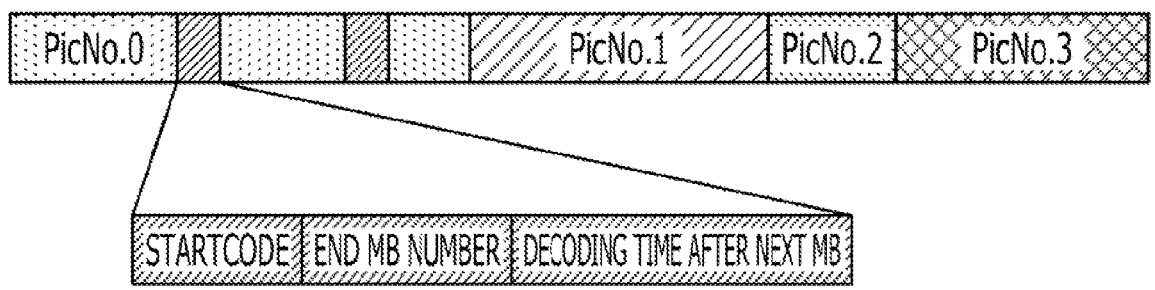
FIG. 9 illustrates an example of attach data.

The VBV management unit 15 generates attach data that includes a start code, "startcode", a division end MB number, "MB_div[divnum]", and a division decoding time, "DTS[divnum]." FIG. 9 illustrates one example of attach data. In the example of FIG. 9, a case in which attach data is inserted into encoded data of a picture of PicNo. 1. As illustrated in FIG. 9, the attach data includes the start code, the end MB number, and the division decoding time. The start code is for identifying attach data from stream data, and for example, a synchronous code such as 0x000001**, which is used by MPEG etc. is used. The end MB number indicates an MB number in a picture that needs to be included before the attach data. The division decoding time indicates estimated time when encoded data with subsequent MB number is decoded by the decoder 30 and is removed from the VBV buffer. In the example of FIG. 8, "MB_div[X−1]" is attached to the end MB number to be decoded at DTS[0], and DTS[1] is attached to division decoding time when data with subsequent MB number X is decoded.

The VBV management unit 15 makes the data transmission unit 14 transmit encoded data up to the end MB number "MB_div[divnum]", and inserts attach data after the end MB number, "MB_div[divnum]."

In this manner, the VBV management unit 15 repeats the above-described processing until the MB number reaches "MAX_MB_NUM." The VBV management unit 15 makes the data transmission unit 14 transmit stream which is not transmitted yet when the MB number reaches "MAX_MB_NUM" and encoding one picture is completed. For example, the VBV management unit 15 makes the data transmission unit 14 transmit encoded data of pictures accumulated in the encoded data buffer 13a when no division is applied. Moreover, the VBV management unit 15 makes the data transmission unit 14 transmit encoded data up to the end MB number, "MB_div[divnum]" and inserts attach data after the end MB number, "MB_div[divnum]" when no division is applied.

When a buffer underflow is not avoided, the VBV management unit 15 executes the following processing. In other words, the VBV management unit 15 calculates the buffer occupancy of the current picture "VBVBOC" by subtracting cumulative sum value of the generated information amount up to the MB number "MAX_MB_NUM" "SumB=ΣB (0~MAX_MB_NUM−1)" from the VBV buffer occupancy "VBVBOC_ini" of a head of a picture.

Figure 10:
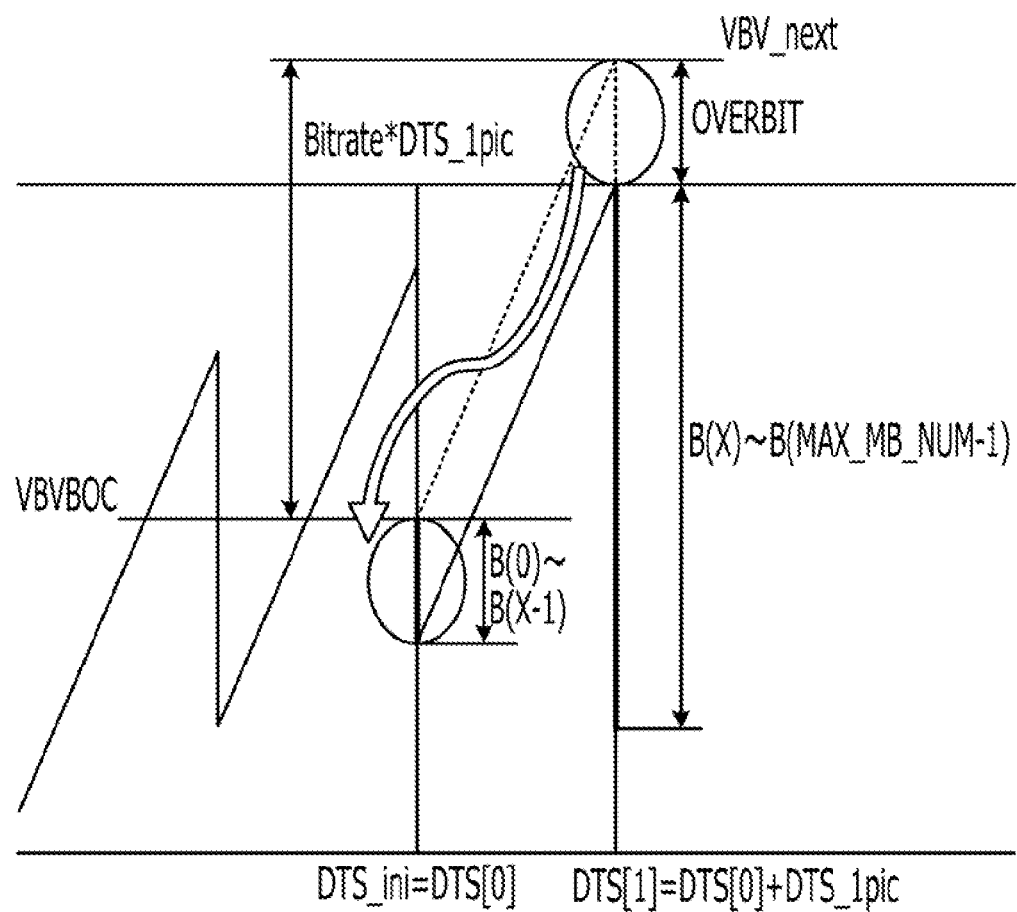
FIG. 10 illustrates processing by the VBV management unit.

The VBV management unit 15 calculates the VBV buffer occupancy that is advanced for 1DTS, "VBVBOC_next." In the example of FIG. 10, the VBV management unit 15 calculates the VBV buffer occupancy that is advanced for 1DTS, "VBVBOC_next" by multiplying the buffer occupancy "VBVBOC" of current picture by DTS addition value for one picture, "DTS_1pic"×bitrate "Bitrate." FIG. 10 illustrates processing by the VBV management unit.

The VBV management unit 15 determines whether the VBV buffer occupancy that is advanced for 1DTS, "VBVBOC_next" exceeds the VBV buffer capacity, "VBVBufferSize", in other words, whether a buffer overflow is caused. In the example of FIG. 10, the VBV buffer occupancy that is advanced for 1DTS, "VBVBOC_next" exceeds the VBV buffer capacity, "VBVBufferSize." Therefore, the VBV management unit 15 determines a buffer overflow is caused.

When no buffer overflow is caused, the VBV management unit 15 determines to cause the decoder 30 to decode subsequent picture at substantially the same timing as decoding encoded data in units of a picture so that decoding subsequent picture is not advanced.

When a buffer overflow is caused, the VBV management unit 15 calculates a size that exceeds the VBV buffer, "Overbit." In the example of FIG. 10, the VBV management unit 15 subtracts the VBV buffer capacity, "VBVBufferSize" from the VBV buffer occupancy that is advanced for 1DTS, "VBVBOC_next" to calculate the size that exceeds the VBV buffer, "Overbit."

The VBV management unit 15 generates attach data that includes a start code, "startcode", a division end MB number, "MB_div[divnum]", and a division decoding time, "DTS[divnum]." The VBV management unit 15 starts encoding a picture to be encoded at subsequent DTS when the VBV management unit 15 makes the decoder 30 decode in units of a picture. The cumulative sum value "SumB" of the generated information amount is reset to 0. The substantially maximum generated information amount threshold "SumB_TH[divnum]" is set to a size of "Overbit" that exceeds the VBV buffer. In the example of FIG. 10, a picture that is to be decoded by the decoder 30 initially at DTS[1] to encode in advance at DTS[0].

The VBV management unit 15 instructs the encoding unit 13 to encode a picture to be encoded at subsequent DTS. The VBV management unit 15 cumulatively adds the generated information amount, "B(mbnum)" obtained from the encoding unit 13 to the previously accumulated sum value "SumB."

The VBV management unit 15 determines whether the cumulative sum value "SumB" of the generated information amount of the current division number, "div_num" is the substantially maximum generated information amount threshold "SumB_TH[divnum]" or more. The VBV management unit 15 makes the encoder unit 13 encode a macro block corresponding to subsequent MB number when the cumulative sum value of the generated information amount of the current division number is less than the substantially maximum generated information amount threshold.

When the cumulative sum value of the generated information amount of the current division number is the substantially maximum generated information amount threshold or more, the VBV management unit 15 executes the following processing. The VBV management unit 15 recalculates the current VBV buffer occupancy, "VBVBOC" by subtracting the cumulative sum value of generated information amount, "SumB" from the previously obtained VBV buffer occupancy "VBVBOC."

The VBV management unit 15 calculates the "VBVBOC_next" that is the VBV buffer occupancy advanced for 1DTS. The VBV management unit 15 generates attach data including a start code, "startcode", a division end MB number, "MB_div[divnum]", and a division decoding time, "DTS[divnum]." In the example of FIG. 10, when "Overbit" is exceeded at MB number "X", encoded data from the MB number 0 to X among pictures to be decoded initially at DTS[1] by the decoder 30 is encoded at DTS[0] in advance. The macro block after the MB number "X+1" is encoded as data of DTS[1] that is initial decoding time.

The VBV management unit 15 makes the data transmission unit 14 transmit encoded data up to the MB number that exceeds "Overbit" and inserts attach data after the end MB number, "MB_div[divnum]." The VBV management unit 15 determines that decoding is started from a MB number subsequent to the MB number that exceeds "Overbit", in other words, the MB number that is not encoded at substantially the same timing as when making the decoder 30 decode in units of a picture.

A configuration of the encoder according to the embodiment will be described. The decoder 30 in FIG. 1 includes a data reception unit 31, an encoded data buffer 32*a*, a decoding unit 33, a buffer management unit 32, a frame memory 34, and a display unit 35.

The data reception unit 31 receives encoded data transmitted by the encoder 10. The data reception unit 31 stores the data received as described above in the encoded data buffer 32*a*, which will be described later.

The encoded data buffer 32*a* accumulates encoded data. For example, the encoded data buffer 32*a* accumulates encoded data received by the data reception unit 31. The encoded data accumulated in the encoded data buffer 32*a* as described above is decoded by a decoding unit 33, which will be described later, and is removed.

The decoding unit 33 decodes encoded data stored in the encoded data buffer 32*a*. For example, the encoding unit 33 takes out encoded data from the encoded data buffer 32*a* and decodes the encoded data.

The frame memory 34 stores frames of a moving image. For example, the frame memory 34 stores frames of a moving image decoded by the decoding unit 33. The display unit 35 is a display device that displays various pieces of information, for example, an image read from the frame memory 34, and includes a monitor, a display, and a touch panel. The display unit 35 displays frames of a B picture decoded by referring to an I picture or a P picture earlier than frames of the I picture or the P picture among frames accumulated in the frame memory 34.

The buffer management unit 32 manages the encoded data buffer 32*a*. For example, the buffer management unit 32 makes the decoding unit 33 decode in units of each divided picture according to a decoding time when the decoding time is not set in units of a picture but is set for in units of each divided picture of moving image data accumulated in the encoded data buffer 32*a*.

Processing flow of a transmission system according to the embodiment is described. Description is made in order of (1) encoding processing executed by the encoder 10 and (2) decoding processing executed by the decoder 30.

Figure 11:
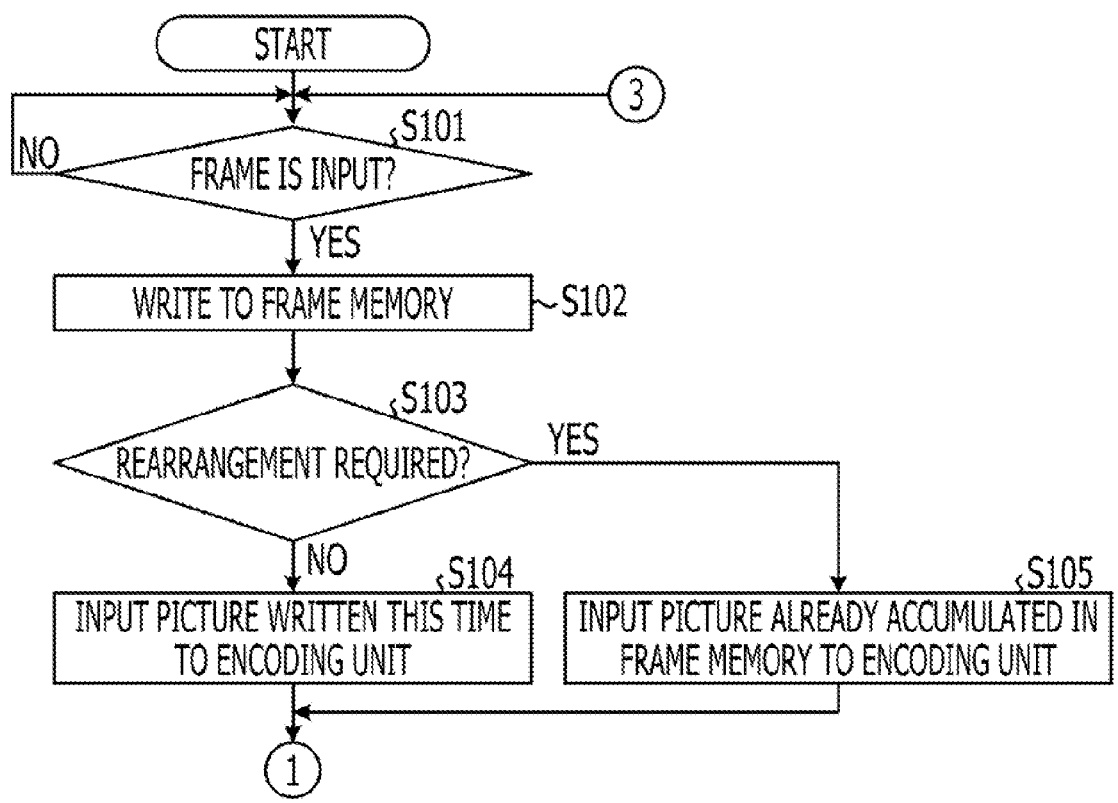
FIG. 11 is a flow chart illustrating a procedure of encoding processing according to the first embodiment.
Figure 12:
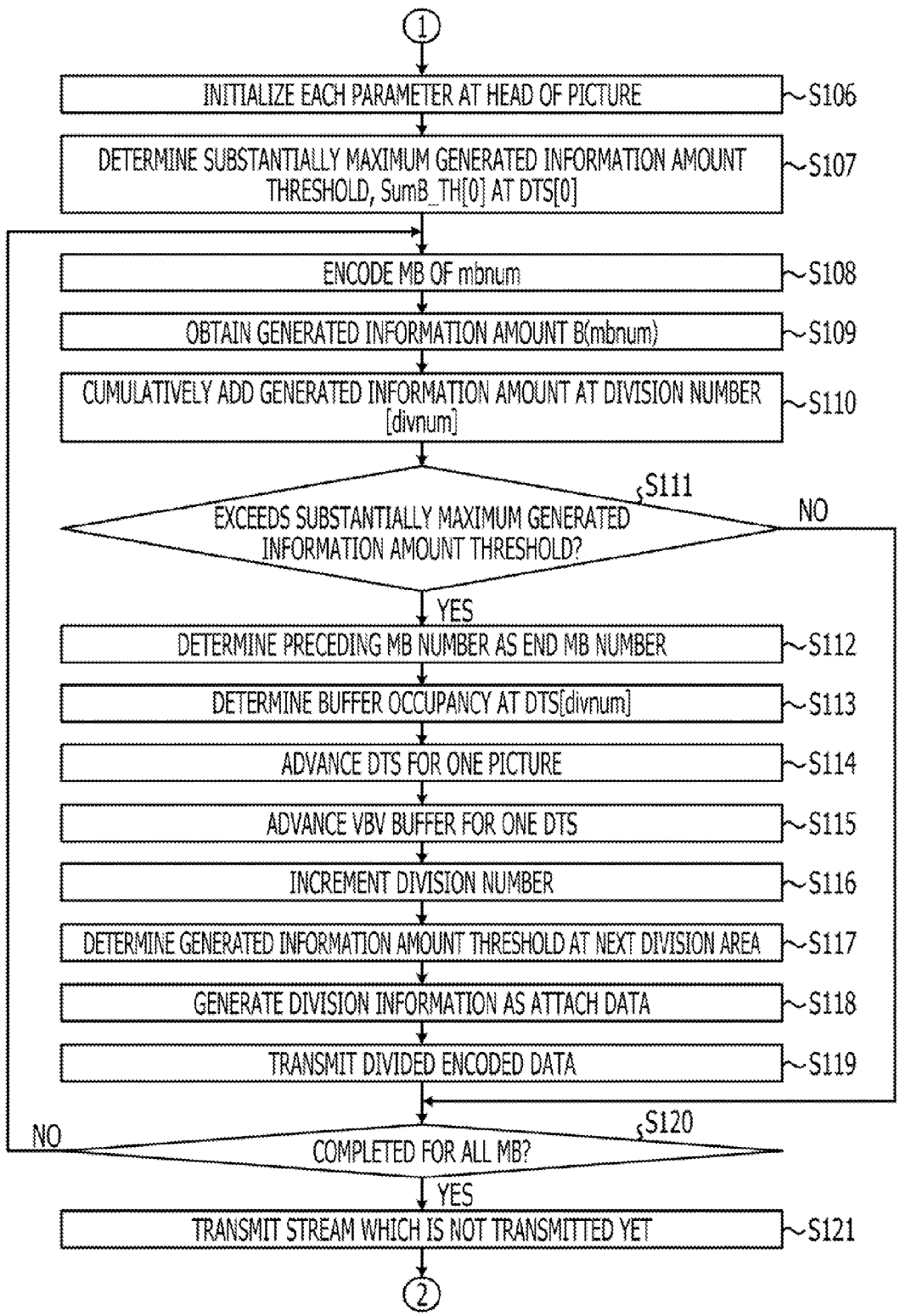
FIG. 12 is a flow chart illustrating a procedure of encoding processing according to the first embodiment.
Figure 13:
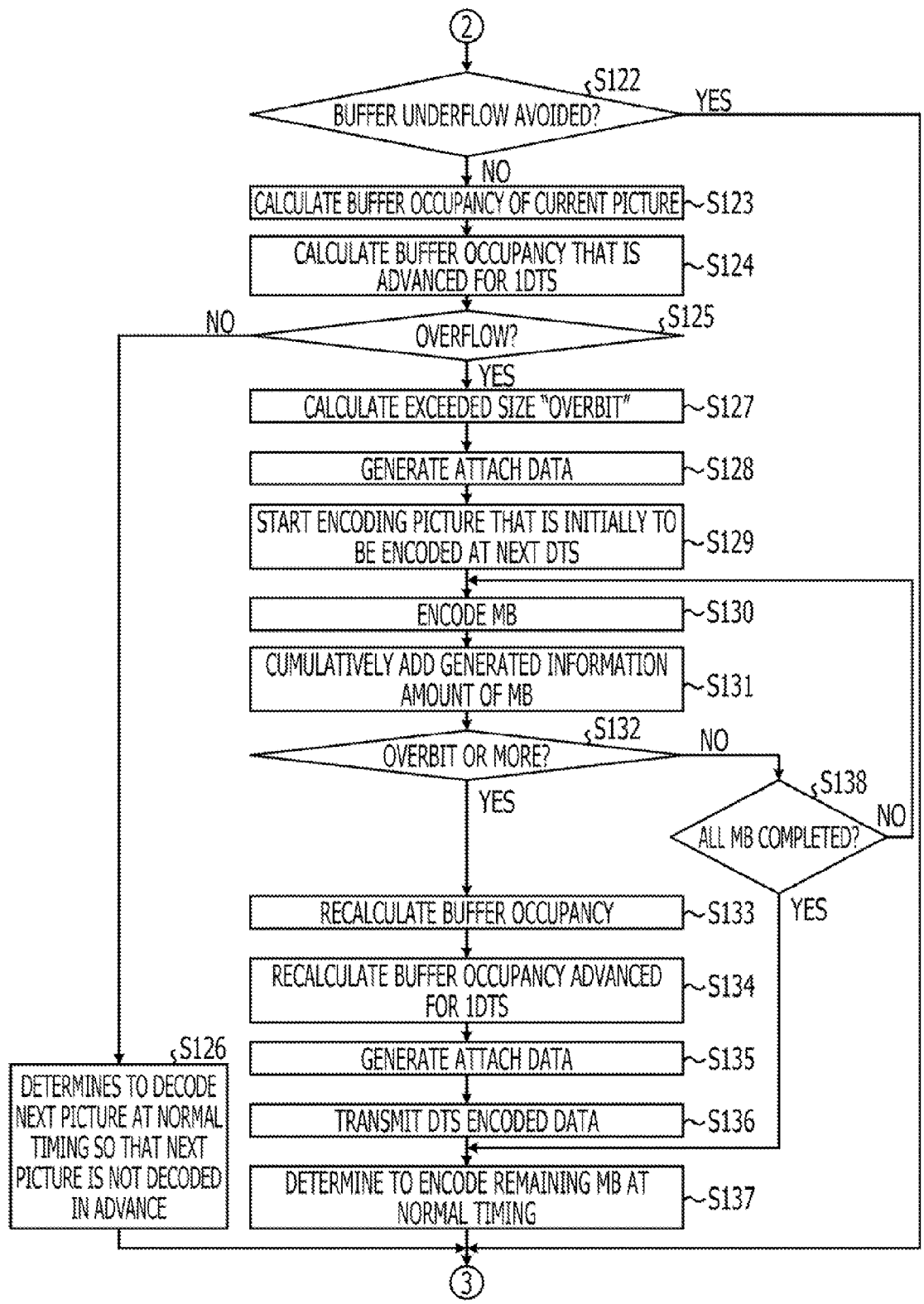
FIG. 13 is a flow chart illustrating a procedure of encoding processing according to the first embodiment.

FIGS. 11 to 13 are flow charts illustrating procedures of encoding processing according to the first embodiment. The encoding processing is activated when the moving image input unit 11 accepts frames of a moving image. As illustrated in FIG. 11, when the moving image input unit 11 accepts frames (Operation S101: Yes), the moving image input unit 11 writes the frames of moving image in the frame memory 12 (Operation S102).

When rearranging frames written in the frame memory 12 is unnecessary, in other words, the picture is an I picture or a P picture (Operation S103: No), the VBV management unit 15 performs the following processing. The VBV management unit 15 inputs the picture written at this time to the encoding unit 13 (Operation S104).

When rearranging frames written in the frame memory 12 is needed, in other words, the picture is a B picture (Operation S103: Yes), the VBV management unit 15 performs the following processing. The VBV management unit 15 inputs the pictures that are already accumulated in the frame memory 12 to the encoding unit 13 (Operation S105).

The VBV management unit 15 initializes each parameter when encoding a macro block of a head of a picture is started (Operation S106). The VBV management unit 15 determines an initial decoding time assigned when the VBV management unit 15 makes the decoder 30 decode in units of a picture, in other words, a substantially maximum generated information amount threshold, "SumB_TH[0]" at division decoding time "DTS[0]" (Operation S107).

The VBV management unit 15 makes the encoding unit 13 encode a macro block corresponding to a current MB number, "mbnum" (Operation S108). The VBV management unit 15 obtains a generated information amount, "B(mbnum)" of the macro block (Operation S109). The VBV management unit 15 cumulatively adds the obtained generated information amount, "B(mbnum)" to previously accumulated sum value of the current division number, "div_num", in other words, executes the following calculation (Operation S110):

$$\text{Sum}B = \Sigma B(i)(MB\_\text{div}[\text{divnum}-1 \sim mb\text{num}])$$

The VBV management unit 15 determines whether the accumulated sum of generated information amount of the current division number, "div_num" exceeds the substantially maximum generated information amount threshold, "SumB_TH[divnum]" (Operation S111). When the accumulated sum of generated information amount is less than the substantially maximum generated information amount threshold (Operation S111: No), the process proceeds to Operation S120.

When the accumulated sum of generated information amount exceeds the substantially maximum generated information amount threshold (Operation S111: Yes), the VBV management unit 15 defines preceding MB number "mbnum" as the end MB number, "MB_div[divnum]" that is a boundary of division (Operation S112). The VBV management unit 15 determines the division VBV buffer occupancy "VBVBOC_divnum" at a division decoding time "DTS[divnum]" (Operation S113).

The VBV management unit 15 advances DTS for one picture by adding a "DTS__1pic" that is a DTS addition value for one picture to the division decoding time "DTS[divnum]" (Operation S114). The VBV management unit 15 advances the occupancy of the VBV buffer for 1DTS (Operation S115). The VBV management unit 15 increments the division number, "div_num" (Operation S116)

The VBV management unit 15 determines the substantially maximum generated information amount threshold, "SumB_TH[divnum]" of the incremented division number, "divnum+1" at decoding time "DTS[divnum+1]" (Operation S117). The VBV management unit 15 generates attach data that includes a start code, "startcode", a division end MB number, "MB_div[divnum]", and a division decoding time, "DTS[divnum]" (Operation S118).

The VBV management unit 15 makes the data transmission unit 14 transmit encoded data up to the end MB number, "MB_div[divnum]", and inserts attach data after the end MB number, "MB_div[divnum]" (Operation S119).

The VBV management unit 15 repeats the above-described operations S108 to S119 until the MB number reaches "MAX_MB_NUM" (Operation S120: No). When the MB number reaches "MAX_MB_NUM" and encoding one picture is completed (Operation S120: Yes), the VBV management unit 15 makes the data transmission unit 14 transmit a stream which is not transmitted yet (Operation S121).

When a buffer underflow is not avoided (Operation S122: No), the VBV management unit 15 calculates the buffer occupancy "VBVBOC" of the current picture (Operation S123). The VBV management unit 15 calculates the VBV buffer occupancy "VBVBOC_next" that is advanced for 1DTS (Operation S124). When a buffer underflow is avoided (Operation S122: Yes), the process returns to the above-described Operation S101.

The VBV management unit 15 determines whether the buffer occupancy "VBVBOC_next" that is advanced for 1DTS exceeds the VBV buffer capacity "VBVBufferSize", in other words, whether the buffer overflow is caused (Operation S125).

When a buffer overflow is not caused (Operation S125: No), the VBV management unit 15 executes the following processing. In other words, the VBV management unit 15 determines to make the decoder 30 decode next picture at substantially the same timing as decoding encoded data in units of a picture so that a next picture is not decoded in advance (Operation S126) and returns to the above described Operation S101.

When a buffer overflow is caused (Operation S125: Yes), the VBV management unit 15 calculates a size that exceeds the VBV buffer, "Overbit" (Operation S127). The VBV management unit 15 generates attach data that includes a start code, "startcode", a division end MB number, "MB_div[divnum]", and a division decoding time, "DTS[divnum]" (Operation S128). The VBV management unit 15 starts encoding a picture that is to be encoded at next DTS when the VBV management unit 15 makes the decoder 30 decode in units of a picture (Operation S129).

The VBV management unit 15 instructs the encoding unit 13 to encode a picture to be encoded at subsequent DTS (Operation S130). The VBV management unit 15 cumulatively adds the generated information amount, "B(mbnum)" obtained from the encoding unit 13 to the cumulative sum value "SumB" (Operation S131).

The VBV management unit 15 determines whether the cumulative sum value "SumB" of the generated information amount of the current division number, "div_num" is the substantially maximum generated information amount threshold "SumB_TH[divnum]" or more (Operation S132). When the cumulative sum value of the generated information amount of the current division number is less than the substantially maximum generated information amount threshold (Operation S132: No), the VBV management unit 15 performs the following processing until processing for macro blocks for all MB numbers is completed (Operation S138: No). In other words, the VBV management unit 15 repeats the above-described Operations S130 to S132.

When the cumulative sum value of the generated information amount of the current division number is the substantially maximum generated information amount threshold or more (Operation S132: Yes), the VBV management unit 15 performs the following processing. In other words, the VBV management unit 15 recalculates the current VBV buffer occupancy, "VBVBOC" by subtracting the cumulative sum of generated information amount, "SumB" from the previously obtained VBV buffer occupancy "VBVBOC" (Operation S133).

The VBV management unit 15 calculates the "VBVBOC_next" that is the VBV buffer occupancy advanced for 1DTS (Operation S134). The VBV management unit 15 generates attach data including a start code, "startcode", a division end MB number, "MB_div[divnum]", and a division decoding time, "DTS[divnum]" (Operation S135).

The VBV management unit 15 makes the data transmission unit 14 transmit encoded data up to the MB number that exceeds "Overbit" and inserts attach data after the end MB number, "MB_div[divnum]" (Operation S136).

The VBV management unit 15 determines that decoding is started from a MB number subsequent to the MB number that exceeds "Overbit", in other words, from the MB number that is not encoded yet at substantially the same timing as when making the decoder 30 decode in units of a picture (Operation S137). The VBV management unit 15 returns to the above-described Operation S101.

Figure 14:
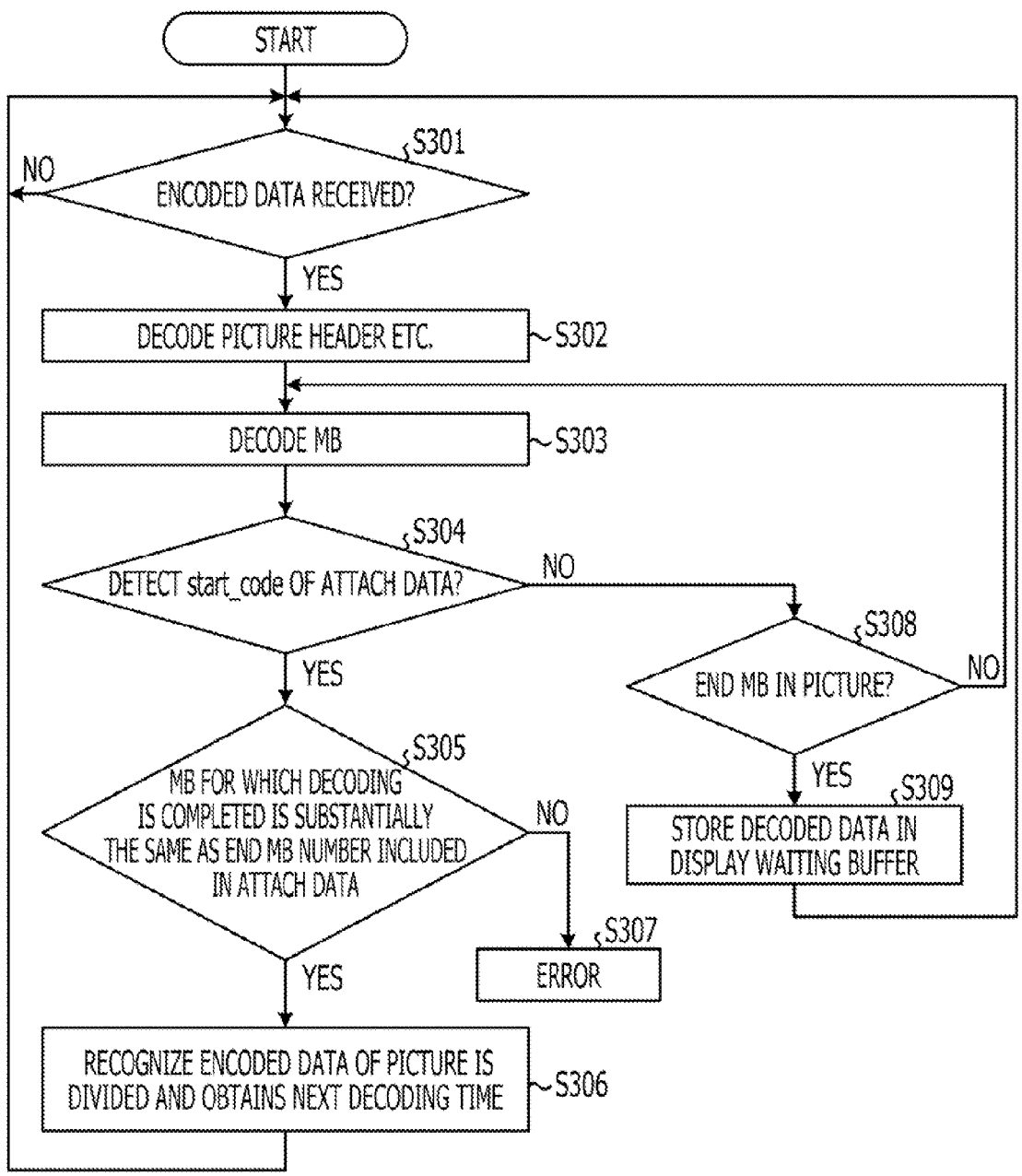
FIG. 14 is a flow chart illustrating a procedure of decoding processing according to the first embodiment.

FIG. 14 is a flow chart illustrating a procedure of decoding processing according to the first embodiment. The decoding processing is activated when the data reception unit 31 receives encoded data to be decoded. As illustrated in FIG. 14, when the encoded data to be decoded is received (Operation S301: Yes), the buffer management unit 32 performs the following processing. In other words, the buffer management unit 32 makes the decoding unit 33 execute decoding processing of a header that is a higher order than macro blocks such as a sequence header, a picture header, and a slice header (Operation S302). The buffer management unit 32 makes the decoding unit 33 decode the macro block (Operation S303).

When a startcode "Startcode" of attach data is detected from the decoded data of the macro block (Operation S304: Yes), the buffer management unit 32 performs the following processing. In other words, the buffer management unit 32 further determines whether a MB number of the macro block for which decoding is completed is substantially the same as the end MB number included in the attach data (Operation S305).

When the MB number of the macro block for which decoding is completed is substantially the same as the end MB number included in the attach data (Operation S305: Yes), the buffer management unit 32 performs the following processing. In other words, the buffer management unit 32 recognizes the encoded data of a picture is divided, obtains subsequent decoding time (Operation S306), and returns to the above-described operation S301.

When the MB number of the macro block for which decoding is completed is not substantially the same as the end MB number included in the attach data (Operation S305: No), the buffer management unit 32 performs the following processing. In other words, the buffer management unit 32 performs error processing because the MB number of the divided position written as attach data by the encoder 10 differs from actually decoded MB number (Operation S307).

When a startcode of attach data is not detected from the decoded data of the macro block (Operation S304: No), the buffer management unit 32 performs the following processing. In other words, the buffer management unit 32 determines whether the MB number of the macro block decoded this time is the end MB in the picture (Operation S308).

When the MB number of the macro block that is decoded this time is the end MB in the picture (Operation S308: Yes), the buffer management unit 32 stores decoded data of the macro block in the frame memory 32 (Operation S309). The buffer management unit 32 returns to processing of the above-described Operation S301. Meanwhile, when the MB number of the macro block that is decoded this time is not the end MB in the picture (Operation S308: No), the process returns to the above-described Operation S303.

As described above, the encoder 10 according to the embodiment divides encoded data of a picture when an underflow or an overflow of the VBV buffer is detected and sets decoding time for each piece of data after the division. Accordingly, the encoder 10 according to the embodiment does not need to increase or decrease an information amount of encoded data even if an underflow or an overflow is caused when the encoder 10 makes the decoder 30 decode in units of a picture. Therefore, the encoder 10 according to the embodiment may achieve substantially uniform image quality among frames of a moving image.

Moreover, the encoder 10 according to the embodiment determines whether an underflow is caused at the VBV buffer based on an information amount of encoded data. The encoder 10 according to the embodiment divides encoded data when the encoder 10 determines an underflow of the VBV buffer is caused, and sets a first decoding time to encoded data in the former part of the divided encoded data. Furthermore, the encoder 10 according to the embodiment sets a second decoding time that is later than the first decoding time to the encoded data in the latter part. Thus, the encoder 10 according to the embodiment may avoid an underflow of the buffer without reducing a total information amount of encoded data.

Furthermore, the encoder 10 according to the embodiment determines whether an overflow is caused at the VBV buffer based on an information amount of the encoded data. When the encoder 10 according to the embodiment determines an overflow is caused at the VBV buffer, sets a first decoding time to encoded data at this time. Moreover, the encoder 10 according to the embodiment divides moving image data to be encoded next time and sets a first decoding time to the divided encoded data in the former part. Furthermore, the encoder 10 according to the embodiment sets a second decoding time that is later than the first decoding time to the encoded data in the latter part. Accordingly, the encoder 10 according to the embodiment may improve image quality because encoded data generated by encoding a moving image may be transmitted in advance without adding data such as a stuffing bit that does not contribute to image quality of the moving image.

The decoder 30 according to the embodiment receives and stores encoded moving image data in the encoded data buffer 32a. The decoder 30 according to the embodiment decodes encoded data in units of a picture according to a decoding time when the decoding time for encoded data accumulated in the encoded data buffer 32a is not set in units of a picture but set in units of each divided picture. Furthermore, the decoder 30 according to the embodiment rearranges order of the decoded moving image data and outputs the decoded moving image data in the order of display time. Hence, the decoder 30 according to the embodiment may output substantially uniform image quality among frames of a moving image while reducing if not preventing a failure of the VBV buffer.

Embodiments of the disclosed device are described above. However, the present disclosure may be implemented by various alternative embodiments other than those described above. Hereinafter, other embodiments included in the present disclosure will be described.

Figure 15:
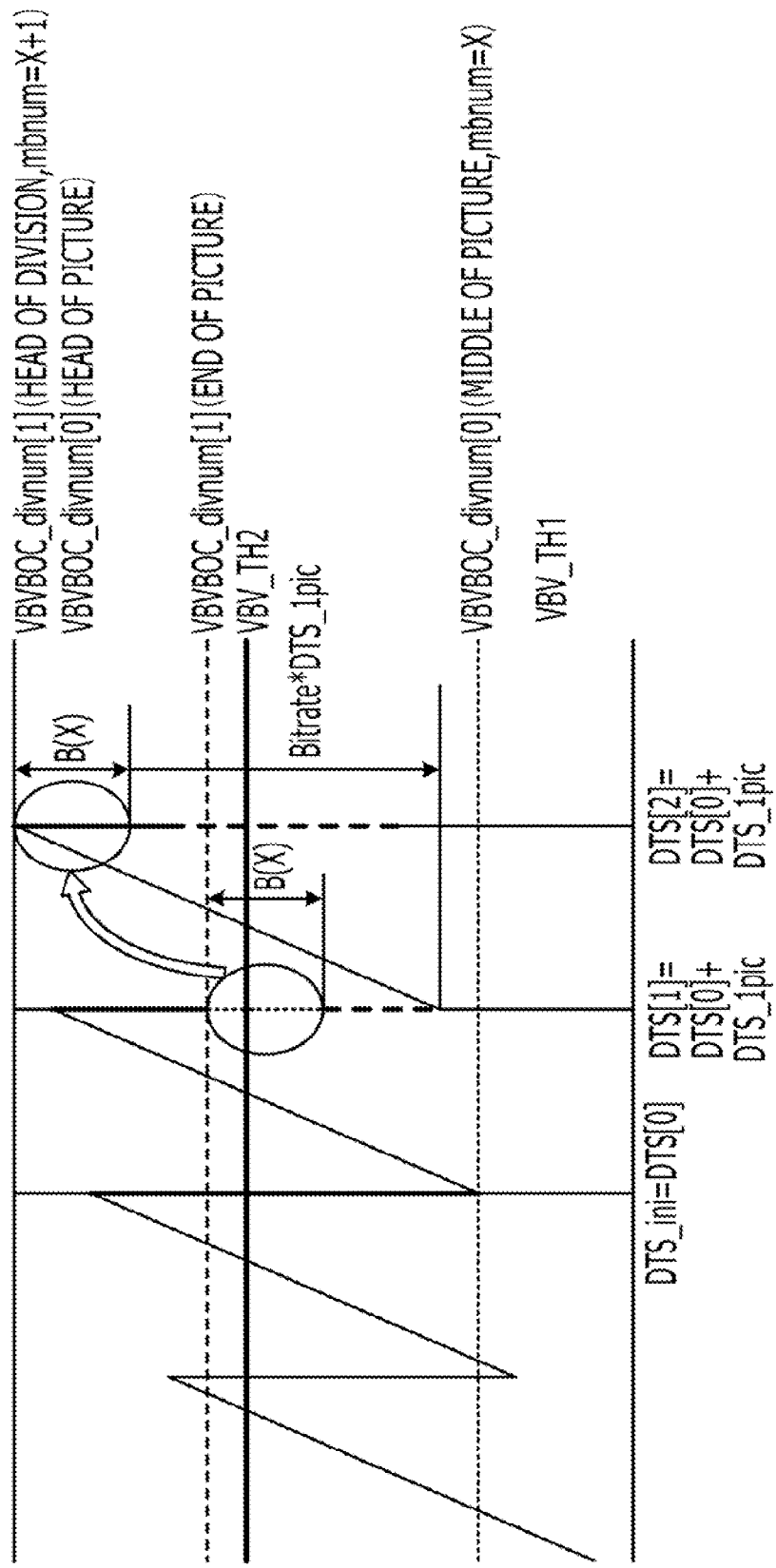
FIG. 15 illustrates an example of an application.
Figure 16:
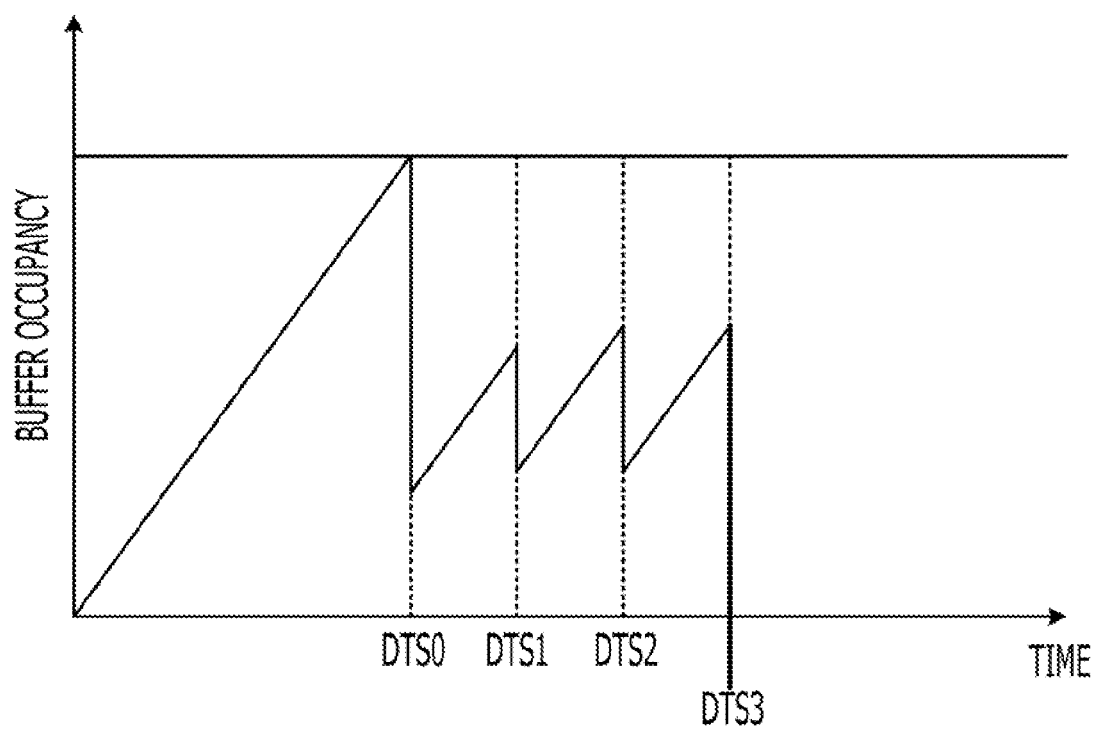
FIG. 16 illustrates a related art example of an occurrence of a buffer underflow.
Figure 17:
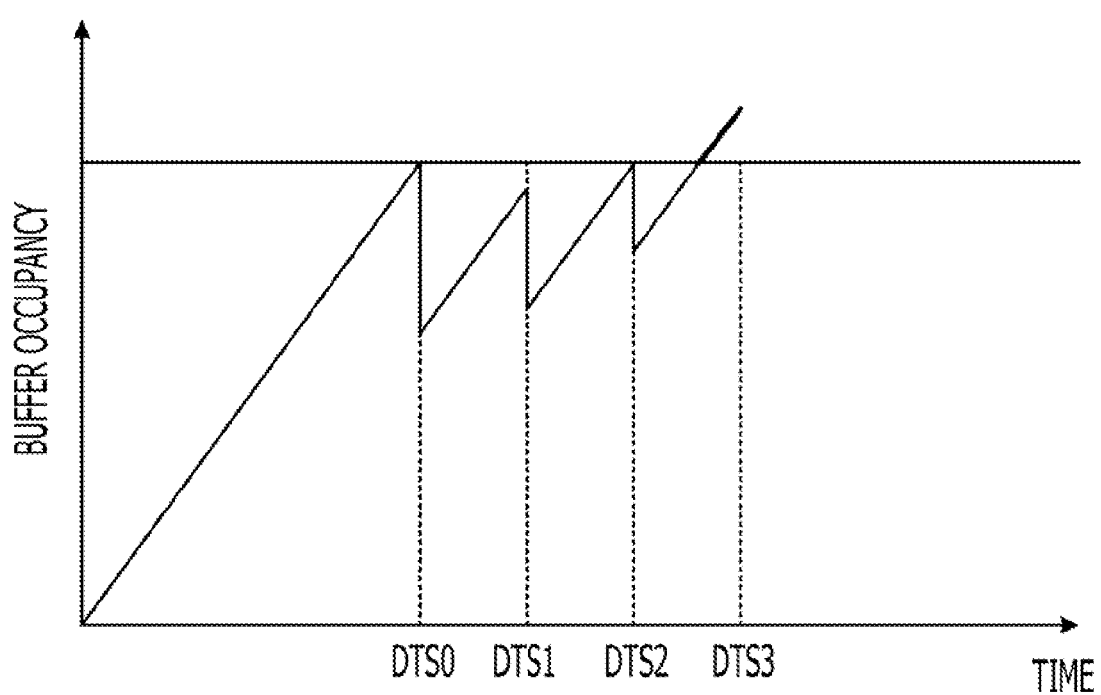
FIG. 17 illustrates a related art example of an occurrence of a buffer overflow.

According to the above-described first embodiment, a case in which one picture is divided into two is described. However, the disclosed device is not limited to this and the device may be applied to a case in which one picture is divided into three as well, for example. FIG. 15 illustrates an example of an application. As illustrated in FIG. 15, when a buffer underflow is caused at DTS [0], decoding the divided data may be postponed to DTS[1] and furthermore, the decoding may be postponed to DTS[2] as well. The picture may be divided into three not only for a buffer underflow, but also for a buffer overflow as well.

Components of each device are not necessarily physically configured as illustrated. In other words, specific forms of decentralization and integration of each of the devices are not limited to those illustrated but all or some of the components may be functionally or physically decentralized or integrated in any unit according to various loads and usage. For example, processing by the VBV management unit 15 may be divided into division processing and decoding time setting processing.

Moreover, various processing described in the above embodiments may be achieved by making a personal computer or a work station, each including one or more processors, to execute prepared encoding program or decoding program. The encoding program and decoding program are not necessarily stored in a Hard Disk Drive (HDD) or a Read Only Memory (ROM) beforehand. For example, each of the programs are stored in a "portable physical medium" that is inserted into a computer. The "portable physical medium" includes a flexible disk (FD), a Compact Disc (CD)-ROM, a Digital Versatile Disc (DVD), a magneto-optical disk, and an integrated circuit (IC) card. The computer may execute each program by reading from the above-described portable physical medium. Moreover, each program is stored in another computer or a server device that are connected through a public network, the Internet, a local area network (LAN), and a wide area network (WAN) and a computer may obtain each program from the above-described media and may execute the programs.

Figure 18:
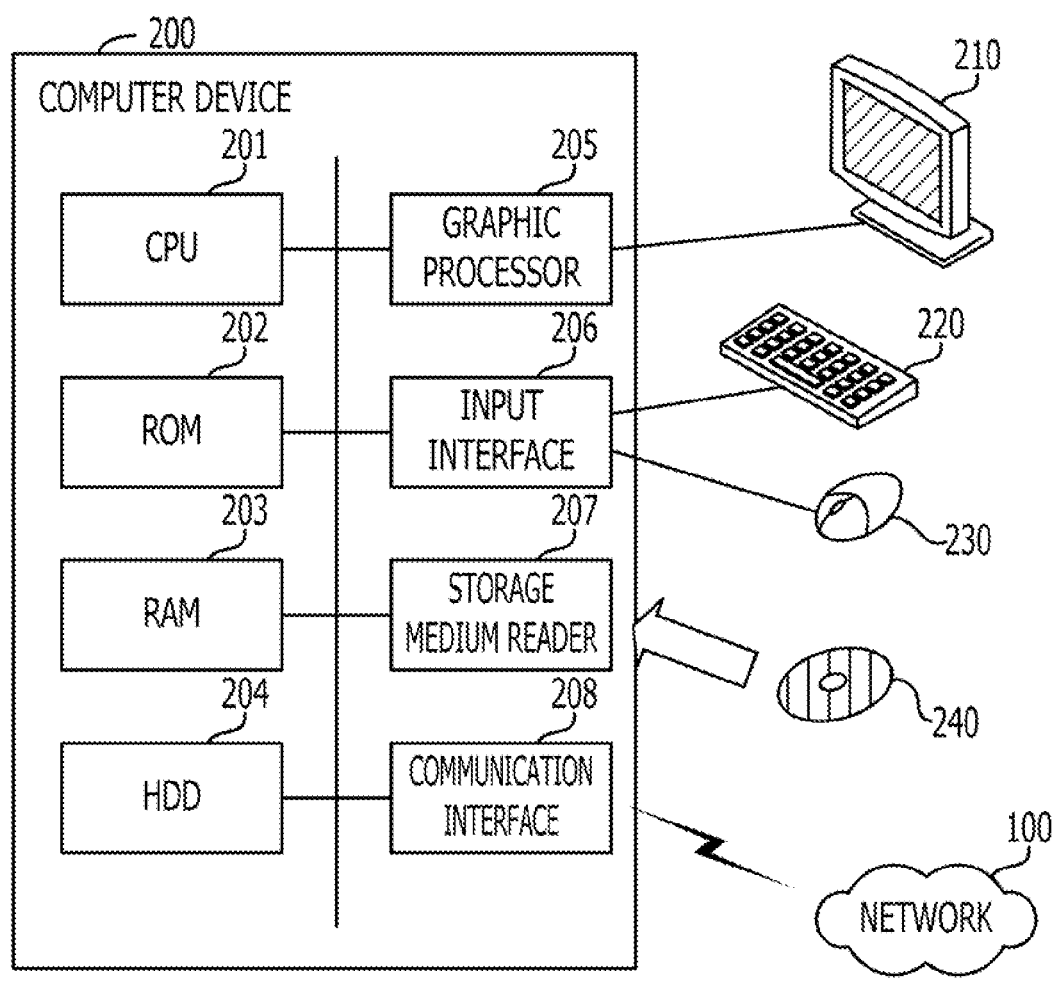
FIG. 18 illustrates a computer hardware configuration of the embodiment.

FIG. 18 illustrates a computer hardware configuration of the embodiment. The computer device 200 includes a CPU 201, a ROM 202, a RAM 203, a Hard Disk Drive (HDD) 204, a graphic processor 205, an input interface 206, a storage medium reader 207, and a communication interface 208.

The CPU 201 executes an OS program and an application program to control the entire computer device 200. The ROM 202 stores a certain program such as a Basic Input/Output System (BIOS) program executed when the computer device 200 is started. The ROM 202 may be a rewritable non-volatile memory.

The RAM 203 temporarily stores at least a part of the OS program and application programs executed by the CPU 201. The RAM 203 temporarily stores at least a part of the data used for processing by the CPU 201.

The HDD 204 stores the OS program and the application programs. Moreover, the HDD 204 stores data used for processing by the CPU 201. Other types of non-volatile storage devices such as a Solid State Drive (SSD) may be used instead of the HDD 204 (or together with the HDD 204).

The graphic processor 205 is coupled to a monitor 210. The graphic processor 205 causes the monitor 210 to display an image according to an instruction from the CPU 201. The input interface 206 is coupled to an input device such as a keyboard 220 or a mouse 230. The input interface 206 outputs an input signal transmitted from the input device to the CPU 201.

The storage medium reader 207 reads data stored in storage medium 240. The storage medium 240 stores a program that is executed by the computer device 200. An program stored in the storage medium 240. In other words, the program may be distributed by storing in the computer-readable storage medium 240.

Various types of storage media may be used as the storage medium 240. The program may be stored in another computer device (not illustrated) that is coupled to the network 100.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An encoding method comprising:
   encoding moving image data;
   determining whether an information amount of the encoded moving image data in units of a picture satisfies a threshold to control a virtual buffer obtained by virtually modeling a reception buffer of a decoding device that is a transmission destination of the encoded moving image data; and
   setting, by dividing a picture included in the encoded moving image data, a decoding time for each divided picture to cause the decoding device to decode each divided picture when the determining determines the information amount of the encoded moving image data does not satisfy the threshold to control the virtual buffer, wherein
   the decoding device divides the encoded moving image data, the decoding time of which is earlier than a display time, and assigns a different decoding time to each of the divided encoded moving image data.

2. The encoding method according to claim 1,
   wherein the determining determines whether an underflow of the virtual buffer is caused based on the information amount of the encoded moving image data, and
   wherein the setting divides the picture included in the encoded moving image when an underflow of the virtual buffer is determined to be caused, and sets a first decoding time to a first divided picture in a former part of the divided picture and sets a second decoding time that is later than the first decoding time to the second divided picture in a latter part of a divided picture.

3. The encoding method according to claim 1,
   wherein the determining determines whether an overflow of the virtual buffer is caused based on the information amount of the encoded moving image data, and
   wherein the setting sets a first decoding time to the moving image data that is encoded at a first time and divides the picture included in the moving image data to be encoded at a second time, and sets the first decoding time to the first divided picture in the former part of the divided picture and sets a second decoding time that is later than the first decoding time to the second divided picture in the latter part when the determining determines an overflow of the virtual buffer is to be caused.

4. An encoding device comprising:
   a processor; and
   a memory which stores a plurality of instructions, which when executed by the processor, cause the processor to,
   encode moving image data;
   determine whether an information amount of the encoded moving image data in units of a picture satisfies a threshold to control a virtual buffer obtained by virtually modeling a reception buffer of a decoding device that is a transmission destination of the encoded moving image data; and
   divide a picture included in the encoded moving image data and to set a decoding time for each divided picture to cause the decoding device to decode each divided picture when the determination determines the information amount of the encoded moving image data does not satisfy the threshold to control the virtual buffer, wherein
   the decoding device divides the encoded moving image data, the decoding time of which is earlier than a display time, and assigns a different decoding time to each of the divided encoded moving image data.

5. The encoding device according to claim 4,
   wherein the determination determines whether an underflow of the virtual buffer is caused based on the information amount of the encoded moving image data, and
   wherein the setting divides the picture included in the encoded moving image data when an underflow of the virtual buffer is determined to be caused, and sets a first decoding time to a first divided picture in a former part of the divided picture and sets a second decoding time that is later than the first decoding time to a second divided picture in a latter part of the divided picture.

6. The encoding device according to claim 5,
   wherein the determination determines whether an overflow of the virtual buffer is caused based on the information amount of encoded moving image data, and
   wherein the setting sets a first decoding time to the moving image data that is encoded at a first time and divides the picture included in the moving image data to be encoded at a second time, and sets a first decoding time to the first divided picture in the former part of the divided picture and sets a second decoding time that is later than the first decoding time to the second divided picture in the latter part of the divided picture.

* * * * *